United States Patent
Jie

(10) Patent No.: US 11,978,239 B2
(45) Date of Patent: *May 7, 2024

(54) TARGET DETECTION METHOD AND APPARATUS, MODEL TRAINING METHOD AND APPARATUS, DEVICE, AND STORAGE MEDIUM

(71) Applicant: TENCENT TECHNOLOGY (SHENZHEN) COMPANY LIMITED, Guangdong (CN)

(72) Inventor: Ze Qun Jie, Shenzhen (CN)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 0 days.

This patent is subject to a terminal disclaimer.

(21) Appl. No.: 18/352,336

(22) Filed: Jul. 14, 2023

(65) Prior Publication Data

US 2023/0360357 A1    Nov. 9, 2023

Related U.S. Application Data

(63) Continuation of application No. 17/313,497, filed on May 6, 2021, now Pat. No. 11,763,541, which is a
(Continued)

(30) Foreign Application Priority Data

Mar. 21, 2019    (CN) .......................... 201910218444.5

(51) Int. Cl.
  *G06V 10/20*    (2022.01)
  *G06F 18/21*    (2023.01)
(Continued)

(52) U.S. Cl.
  CPC .......... *G06V 10/255* (2022.01); *G06F 18/214* (2023.01); *G06F 18/217* (2023.01);
(Continued)

(58) Field of Classification Search
  CPC .... G06V 10/255; G06V 10/764; G06V 10/82; G06V 20/58; G06V 10/24; G06F 18/214;
(Continued)

(56) References Cited

U.S. PATENT DOCUMENTS 11,429,841 B1    8/2022  Huh et al.
2018/0373999 A1  12/2018  Xu
(Continued)

FOREIGN PATENT DOCUMENTS

CN    108564127 A    9/2018
CN    108710896 A   10/2018
CN    109919251 A    6/2019

OTHER PUBLICATIONS

Asha Anoosheh et al., "ComboGAN: Unrestrained Scalability for Image Domain Translation", 2018 IEEE/CVF Conference on Computer Vision and Pattern Recognition Workshops (CVPRW), Jun. 18, 2018, pp. 896-903 (8 pages total).
(Continued)

*Primary Examiner* — Juan A Torres
(74) *Attorney, Agent, or Firm* — Sughrue Mion, PLLC

(57) ABSTRACT

The disclosure provides a target detection method and apparatus, a model training method and apparatus, a device, and a storage medium. The target detection method includes: obtaining a first image; obtaining a second image corresponding to the first image, the second image belonging to a second domain; and obtaining a detection result corresponding to the second image through a cross-domain image detection model, the detection result including target localization information and target class information of a target
(Continued)

object, the cross-domain image detection model including a first network model configured to convert an image from a first domain into an image in the second domain, and the second network model configured to perform region localization on the image in the second domain.

20 Claims, 12 Drawing Sheets

Related U.S. Application Data continuation of application No. PCT/CN2020/079218, filed on Mar. 13, 2020.

(51) Int. Cl.
| | | |
|---|---|---|
| *G06F 18/214* | (2023.01) | |
| *G06V 10/764* | (2022.01) | |
| *G06V 10/82* | (2022.01) | |
| *G06V 20/58* | (2022.01) | |

(52) U.S. Cl.
CPC ............ *G06V 10/764* (2022.01); *G06V 10/82* (2022.01); *G06V 20/58* (2022.01)

(58) Field of Classification Search
CPC ....... G06F 18/217; G06F 18/00; G06N 3/047; G06N 3/08; G06N 7/01; G06N 3/045
USPC ........................................................ 382/156
See application file for complete search history.

(56) References Cited

U.S. PATENT DOCUMENTS

| | | | |
|---|---|---|---|
| 2019/0130220 A1* | 5/2019 | Zou | .......................... G06N 3/08 |
| 2020/0082221 A1 | 3/2020 | Tsai et al. | |
| 2020/0134425 A1* | 4/2020 | Chen | ........................ G06N 3/08 |

OTHER PUBLICATIONS

Extended European Search Report dated May 4, 2022 in Application No. 20772861.9.
International Search Report for PCT/CN2020/079218 dated Jun. 22, 2020 (PCT/ISA/210).
Office Action dated May 30, 2022 by the Japanese Patent Office in Japanese Application No. 2021-519836.
Qikai Liu, "Image Classification Based on Semi-supervised Generative Adversarial Network", Chinese Doctoral Dissertations Full-text Database (Electronic Journal), Feb. 15, 2019, 77 pages, No. 2.
Supplementary European Search Report dated May 24, 2022 in Application No. 20772861.9.
Written Opinion for PCT/CN2020/079218 dated Jun. 22, 2020 (PCT/ISA/237).
Yuhu Shan et al., "Pixel and Feature Level Based Domain Adaption for Object Detection in Autonomous Driving", arXiv, 2018, pp. 2-9 (8 pages total).
Zeyu Wang, "Research on Deep Learning Networks for Scene Parsing", A Dissertation for the Degree of D.Eng, Chinese Doctoral Dissertations Full-text Database (Electronic Journal), China Academic Journal Electronic Publishing House, Feb. 15, 2019, 153 pages, No. 2.
Translation of the Written Opinion of the International Searching Authority dated Jun. 22, 2020 in Application No. PCT/CN2020/079218.
Sheng-Wei Huang, et al., "AugGAN: Cross Domain Adaptation with GAN-Based Data Augmentation", Advances in Databases and information systems, Springer International Publishing, Cham, XP047496874 Oct. 5, 2018, pp. 731-744 (9 pages).
European Office Action dated Dec. 19, 2023 in Application No. 20 772 861.9.

* cited by examiner (a)

(b)

TARGET DETECTION METHOD AND APPARATUS, MODEL TRAINING METHOD AND APPARATUS, DEVICE, AND STORAGE MEDIUM

CROSS-REFERENCE TO RELATED APPLICATION(S)

This application is a continuation application of U.S. Ser. No. 17/313,497, which is a bypass continuation application of International Application No. PCT/CN2020/079218, entitled "TARGET DETECTION METHOD, MODEL TRAINING METHOD, DEVICE, APPARATUS AND STORAGE MEDIUM" and filed Mar. 13, 2020, which claims priority to Chinese Patent Application No. 201910218444.5, entitled "IMAGE-BASED TARGET DETECTION METHOD AND APPARATUS, AND MODEL TRAINING METHOD AND APPARATUS" and filed on Mar. 21, 2019, the disclosures of which are herein incorporated by reference in their entireties.

FIELD

The disclosure relates to the field of artificial intelligence, and in particular, relates to a target detection method and apparatus, a model training method and apparatus, a device, and a storage medium.

BACKGROUND

In the field of machine learning, samples generally need to be divided into two independent parts, respectively being a training set and a test set, the training set is used for supervised learning, and the supervised learning refers to a process of adjusting a parameter of a classifier by using a group of samples in a known class, to cause the classifier to achieve required performance, and is also referred to as supervised training. The test set is used for evaluating how well a finally selected model performs. In the field of image processing, it commonly occurs that a domain difference between a training image and a test image is relatively large.

Currently, when a training set image and a test set image come from different domains, a feature extracted by a network model is generally constrained in dependence on an adversarial loss function, so that the network model cannot identify a domain from which the training set image comes, thereby being insensitive to feature distribution domains.

However, the training set image and the test set image have a natural domain distribution difference. Therefore, it is quite difficult to force the network model to blur features of the training set image and the test set image. As a result, predicting a test set image in a domain B by using a network model obtained through training with a training set image in a domain A causes a relatively poor prediction effect.

SUMMARY

Embodiments of the disclosure provide a target detection method and apparatus, a model training method and apparatus, a device, and a storage medium, to perform target localization without a need to purposely use an image to be detected in a style the same as that of a test set image, but convert the style of the image into the style of the test set image by using a cross-domain image detection model, and then perform target localization on an image obtained after conversion, thereby improving accuracy of image localization and enhancing a model prediction effect.

According to an aspect of an example embodiment of the disclosure, provided is an image-based target detection method, including:

obtaining a first image, the first image belonging to a first domain;

obtaining a second image corresponding to the first image, the second image belonging to a second domain, and the first domain and the second domain being different domains; and obtaining a detection result corresponding to the second image through a cross-domain image detection model, the detection result including target localization information and target class information of a target object, the target object being a detected object in the first image, the cross-domain image detection model including a first network model and a second network model, the first network model being used for converting an image from the first domain into an image in the second domain, and the second network model being used for performing region localization on the image in the second domain.

According to an aspect of an example embodiment of the disclosure, provided is a model training method, including:

obtaining a training image and a test image, the training image belonging to a first domain, the test image belonging to a second domain, and the first domain and the second domain being different domains;

obtaining a test style image corresponding to the training image through a first network model, and obtaining a training style image corresponding to the test image through the first network model, the test style image belonging to the second domain, and the training style image belonging to the first domain;

obtaining a predicted probability value corresponding to a candidate region through a second network model, the candidate region being a candidate bounding box extracted from the test image or the test style image;

obtaining a first prediction class probability value, a first prediction localization value, a second prediction class probability value, and a second prediction localization value that correspond to the test style image through the second network model; and training the first network model and the second network model by using a target loss function and according to the predicted probability value, the test style image, the training style image, the first prediction class probability value, the first prediction localization value, the second prediction class probability value, and the second prediction localization value, to obtain a cross-domain image detection model.

According to an aspect of an example embodiment of the disclosure, provided is a target detection apparatus, including:

at least one memory configured to store program code; and at least one processor configured to read the program code and operate as instructed by the program code, the program code comprising:

first obtaining code configured to cause at least one of the at least one processor to obtain a first image, the first image belonging to a first domain;

second obtaining code configured to cause at least one of the at least one processor to obtain a second image corresponding to the first image, the second image belonging to a second domain, and the first domain and the second domain being different domains; and detection code configured to cause at least one of the at least one processor to obtain, through a cross-domain image detection model, a detection result corresponding to the second image, the detection result including target localization information and target class information of a target object, the target object being a detected object in the first image, the cross-domain image detection model including a first network model and a second network model, the first network model being used for converting an image from the first domain into an image in the second domain, and the second network model being used for performing region localization on the image in the second domain.

According to an aspect of an example embodiment of the disclosure, provided is a model training apparatus, including:

at least one memory configured to store program code; and at least one processor configured to read the program code and operate as instructed by the program code, the program code comprising:

first obtaining code configured to cause at least one of the at least one processor to obtain a training image and a test image, the training image belonging to a first domain, the test image belonging to a second domain, and the first domain and the second domain being different domains;

second obtaining code configured to cause at least one of the at least one processor to obtain a test style image corresponding to the training image through a first network model, and obtain a training style image corresponding to the test image through the first network model, the test style image belonging to the second domain, and the training style image belonging to the first domain;

third obtaining code configured to cause at least one of the at least one processor to obtain a predicted probability value corresponding to a candidate region through a second network model, the candidate region being a candidate bounding box extracted from the test image or the test style image;

fourth obtaining code configured to cause at least one of the at least one processor to obtain a first prediction class probability value, a first prediction localization value, a second prediction class probability value, and a second prediction localization value that correspond to the test style image through the second network model; and training code configured to cause at least one of the at least one processor to train the first network model and the second network model by using a target loss function and according to the predicted probability value, the test style image, the training style image, the first prediction class probability value, the first prediction localization value, the second prediction class probability value, and the second prediction localization value, to obtain a cross-domain image detection model.

The training code may be further configured to cause at least one of the at least one processor to:

style image;

determine a first loss function according to the test style image and the training determine a second loss function according to the predicted probability value;

determine a third loss function according to the first prediction class probability value, the first prediction localization value, the second prediction class probability value, and the second prediction localization value;

generate the target loss function according to the first loss function, the second loss function, and the third loss function; and train the first network model and the second network model by using the target loss function.

The training code may be further configured to cause at least one of the at least one processor to:

determine the first loss function in the following manner:

$L_{cyc}(G_{t-s}, G_{s-t}) = E_{t \sim X(t)}[\|G_{s-t}(G_{t-s}(x_t)) - x_t\|] + E_{s \sim X(s)}[\|G_{t-s}(G_{s-t}(x_s)) - x_s\|]$, where $L_{cyc}(G_{t-s}, G_{s-t})$ represents the first loss function, $x_t$ represents the test image, $x_s$ represents the training image, $G_{s-t}$ represents a generator for converting the training image into the test style image, $G_{t-s}$ represents a generator for converting the test image into the training style image, $G_{t-s}(x_t)$ represents the training style image, $G_{s-t}(x_s)$ represents the test style image, $E_{s \sim X(s)}$ represents calculating an expected value of each training image in a training image set, and $E_{t \sim X(t)}$ represents calculating an expected value of each test image in a test image set.

The program code may further include:

detection code configured to cause at least one of the at least one processor to perform reality detection on the test style image through a first discriminator, where the first discriminator is obtained based on training by using a first adversarial loss function; and the detection code being further configured to cause at least one of the at least one processor to perform reality detection on the training style image through a second discriminator, where the second discriminator is obtained based on training by using a second adversarial loss function.

The program code may further include:

fifth obtaining code being further configured to cause at least one of the at least one processor to obtain the first adversarial loss function in the following manner:

$L_{GAN}(D_t, G_{s-t}) = E_{t \sim X(t)}[\log D_t(x)] + E_{s \sim X(s)}[\log(1 - D_t(G_{s-t}(s)))]$, where $L_{GAN}(D_t, G_{s-t})$ represents the first adversarial loss function, $E_{s \sim X(s)}$ represents calculating an expected value of each training image in a training image set, $E_{t \sim X(t)}$ represents calculating an expected value of each test image in a test image set, $D_t(\ )$ represents the first discriminator, s represents an image in the first domain, $G_{s-t}(\ )$ represents a network for converting the image in the first domain into an image in the second domain, and x represents an inputted image.

The program code may further include:

sixth obtaining code being further configured to cause at least one of the at least one processor to obtain the second adversarial loss function in the following manner:

$L_{GAN}(D_s, G_{t-s}) = E_{s \sim X(s)}[\log D_s(x)] + E_{t \sim X(t)}[\log(1 - D_s(G_{t-s}(t)))]$, where $L_{GAN}(D_s, G_{t-s})$ represents the second adversarial loss function, $E_{s \sim X(s)}$ represents calculating an expected value of each training image in a training image set, $E_{t \sim X(t)}$ represents calculating an expected value of each test image in a test image set, $D_s(\ )$ represents the second discriminator, t represents an image in the second domain, $G_{t-s}(\ )$ represents a network for converting the image in the second domain into an image in the first domain, and x represents an inputted image.

The training code may be further configured to cause at least one of the at least one processor to:
determine the second loss function in the following manner:

$$L_{domain} = -\Sigma_{i,j}[d \log p_{i,j} + (1-d)\log(1-p_{i,j})],$$

where $L_{domain}$ represents the second loss function, $p_{i,j}$ represents a predicted probability value of an $i^{th}$ candidate region on a $j^{th}$ class, and d represents an image source value.

The training code may be further configured to cause at least one of the at least one processor to:
determine the third loss function in the following manner:

$$L_{det}(p,u,t^m,v) = L_{rpn\text{-}cls}(p_{rpn}, u_{rpn}) + L_{rpn\text{-}loc}(t_{rpn}^m, v_{rpn}) + L_{obj\text{-}cls}(p_{obj}, u_{obj}) + L_{obj\text{-}loc}(t_{obj}^m, v_{obj}).$$

where $L(p,u,t^m,v)_{det}$ represents the third loss function, $L_{rpn\text{-}cls}$ represents a classification loss function of a region proposal network (RPN) in the second network model, $p_{rpn}$ represents the first prediction class probability value of the RPN, $u_{rpn}$ represents a first real class probability value of the RPN, $L_{rpn}$-loc represents a localization loss function of the RPN in the second network model, $t_{rpn}^m$ represents the first prediction localization value of the RPN, $v_{rpn}$ represents a first real localization value of the RPN, $L_{obj\text{-}cls}$ represents a classification loss function of a target detection network in the second network model, $p_{obj}$ represents the second prediction class probability value of the target detection network, $u_{obj}$ represents a second real class probability value of the target detection network, $L_{obj\text{-}loc}$ represents a localization loss function of the target detection network in the second network model, $t_{obj}^m$ represents the second prediction localization value of the target detection network, and Vow represents a second real localization value of the target detection network.

The training code may be further configured to cause at least one of the at least one processor to:
determine the target loss function in the following manner:

$$L = L_{cyc}(G_{t\text{-}s}, G_{s\text{-}t}) + L_{domain} + L_{det},$$

where L represents the target loss function, $L_{cyc}(G_{t\text{-}s}, G_{s\text{-}t})$ represents the first loss function, $L_{domain}$ represents the second loss function, and $L_{det}$ represents the third loss function.

According to an aspect of an example embodiment of the disclosure, provided is a terminal device, including: a memory, a transceiver, a processor, and a bus system, the memory being configured to store a program;
the processor being configured to execute the program in the memory to perform the following operations:
obtaining a first image, the first image belonging to a first domain;
obtaining a second image corresponding to the first image, the second image belonging to a second domain, and the first domain and the second domain being different domains; and
obtaining a detection result corresponding to the second image through a cross-domain image detection model, the detection result including target localization information and target class information of a target object, the target object being a detected object in the first image, the cross-domain image detection model including a first network model and a second network model, the first network model being used for converting an image from the first domain into an image in the second domain, and the second network model being used for performing region localization on the image in the second domain; and the bus system being configured to connect the memory and the processor to cause the memory and the processor to perform communication.

According to an aspect of an example embodiment of the disclosure, provided is a server, including a memory, a transceiver, a processor, and a bus system,
the memory being configured to store a program;
the processor being configured to execute the program in the memory to perform the following operations:
obtaining a training image and a test image, the training image belonging to a first domain, the test image belonging to a second domain, and the first domain and the second domain being different domains;
obtaining a test style image corresponding to the training image through a first network model, and obtaining a training style image corresponding to the test image through the first network model, the test style image belonging to the second domain, and the training style image belonging to the first domain;
obtaining a predicted probability value corresponding to a candidate region through a second network model, the candidate region being a candidate bounding box extracted from the test image or the test style image;
obtaining a first prediction class probability value, a first prediction localization value, a second prediction class probability value, and a second prediction localization value that correspond to the test style image through the second network model; and
training the first network model and the second network model by using a target loss function and according to the predicted probability value, the test style image, the training style image, the first prediction class probability value, the first prediction localization value, the second prediction class probability value, and the second prediction localization value, to obtain a cross-domain image detection model.

the bus system being configured to connect the memory and the processor to cause the memory and the processor to perform communication.

According to an aspect of an example embodiment of the disclosure, provided is a non-transitory computer-readable storage medium storing program code, the program code being executable by at least one processor to cause the at least one processor to perform the following model training operations:
obtaining a training image and a test image, the training image belonging to a first domain, the test image belonging to a second domain, and the first domain and the second domain being different domains;
obtaining a test style image corresponding to the training image through a first network model, and obtaining a training style image corresponding to the test image through the first network model, the test style image belonging to the second domain, and the training style image belonging to the first domain;
obtaining a predicted probability value corresponding to a candidate region through a second network model, the candidate region being a candidate bounding box extracted from the test image or the test style image;
obtaining a first prediction class probability value, a first prediction localization value, a second prediction class probability value, and a second prediction localization value that correspond to the test style image through the second network model; and training the first network model and the second network model by using a target loss function and according to the predicted probability value, the test style image, the training style image, the first prediction class probability value, the first prediction localization value, the second prediction class probability value, and the second prediction localization value, to obtain a cross-domain image detection model;

According to an aspect of an example embodiment of the disclosure, provided is a non-transitory computer-readable storage medium storing program code, the program code being executable by at least one processor to cause the at least one processor to perform the following target detection operations:

obtaining a first image, the first image belonging to a first domain;

obtaining a second image corresponding to the first image, the second image belonging to a second domain, and the first domain and the second domain being different domains; and obtaining a detection result corresponding to the second image through a cross-domain image detection model, the detection result including target localization information and target class information of a target object, the target object being a detected object in the first image, the cross-domain image detection model including a first network model and a second network model, the first network model being used for converting an image from the first domain into an image in the second domain, and the second network model being used for performing region localization on the image in the second domain.

BRIEF DESCRIPTION OF THE DRAWINGS

The above and/or other aspects will become apparent and more readily appreciated by describing certain example embodiments with reference to the accompanying drawings.

DETAILED DESCRIPTION

Embodiments of the disclosure provide an image-based target detection method and apparatus, and a model training method and apparatus, to perform target localization without a need to purposely use an image in a style the same as that of a test set image, but convert the style of the image into the style of the test set image by using a cross-domain image detection model, and then perform target localization on an image obtained after conversion, thereby improving accuracy of image localization and enhancing a model prediction effect.

The terms "first", "second", "third", "fourth", and the like (if any) in the specification and the claims of the disclosure and the foregoing accompanying drawings are used for distinguishing similar objects, and are not necessarily used for describing a particular sequence or order. It would be understood that the data termed in such a way is interchangeable in proper circumstances, so that the embodiments of the disclosure described herein for example, may be implemented in other orders than the order illustrated or described herein. In addition, the terms "include", "corresponding to" and any other variants are intended to cover the non-exclusive inclusion. For example, a process, method, system, product, or device that includes a series of operations or units is not necessarily limited to those expressly listed operations or units, but may include other operations or units not expressly listed or inherent to such a process, method, product, or device.

Figure 1:
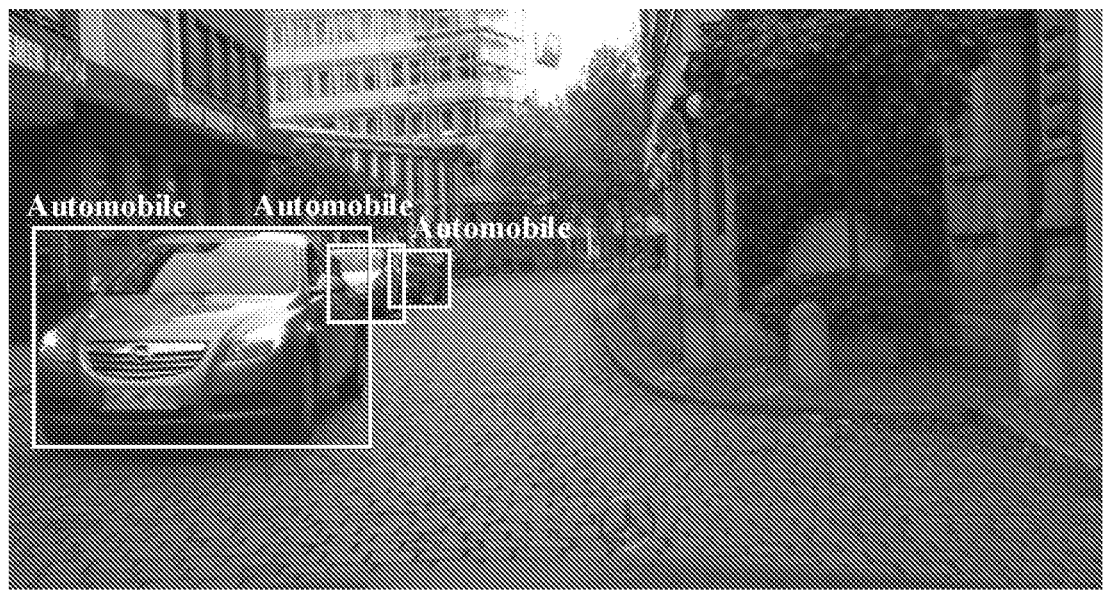
FIG. 1 is a schematic comparison diagram of cross-domain target detection according to an embodiment of the disclosure.
Figure 1:
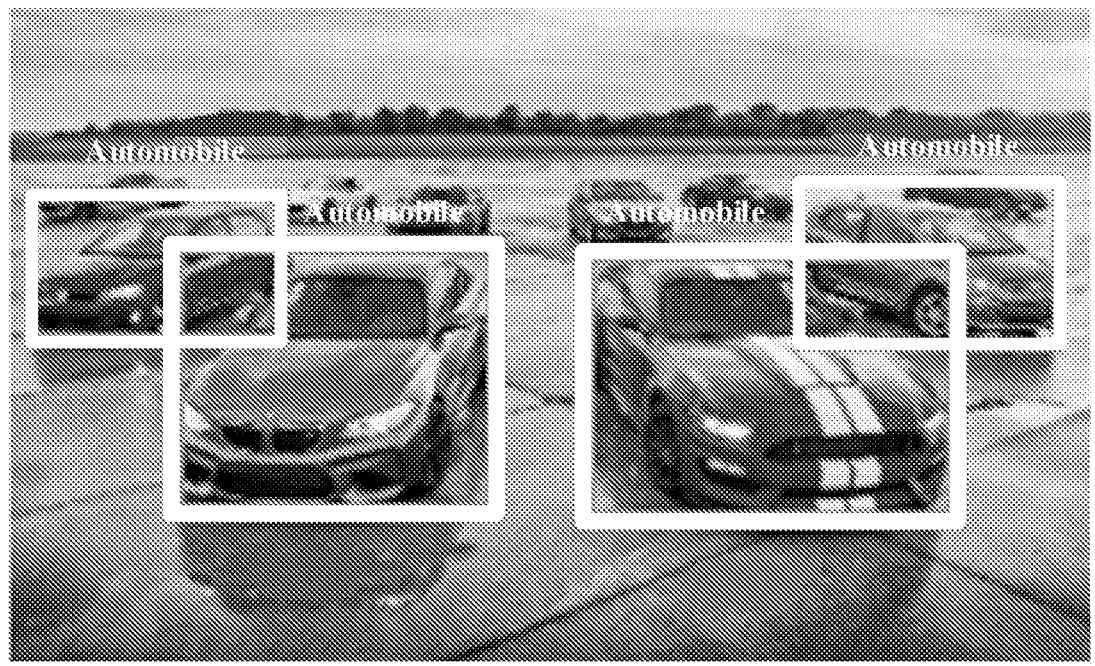

It is to be understood that, the disclosure proposes a cross-domain image target detection method based on adversarial learning, which is applicable to resolving a problem of low test precision caused when a deep convolutional neural network deals with different distribution of training set data and test set data. The embodiments of the disclosure may be widely used for an image target detection task, and in particular, is useful in a case where domain distribution of a training set image and that of a test set image are different. In most cases, domain distribution of a training set image and that of a test set image are different. For example, in a target detection scenario of an unmanned vehicle, a training set image used during training is a picture of a city A, while a test set image used during a test comes is a picture of a city B. It can be seen that scenario pictures of two cities are generally inconsistent in domain distribution. In another example, a training set image used during training is an indoor scene picture, while a test set image used during a test is an outdoor scene picture. It can be seen that indoor and outdoor scene pictures are inconsistent in domain distribution. In another example, a brand and a color of an automobile in a training set image used during training may respectively be different from a brand and a color of an automobile in a test set image used during a test. FIG. 1 is a schematic comparison diagram of cross-domain target detection according to an embodiment of the disclosure. An image (a) and an image (b) of FIG. 1 respectively have two types of domain distribution. Although an object such as "automobile" may be detected in both of the two images, the two images differ greatly in style. It is well known that, when a relatively large difference exists between domain distribution of a training set image and that of a test set image, a deep network is generally poor in generalization performance on the test set image and low in test precision, and a deep network model for target detection similarly cannot avoid the problem.

Figure 2:
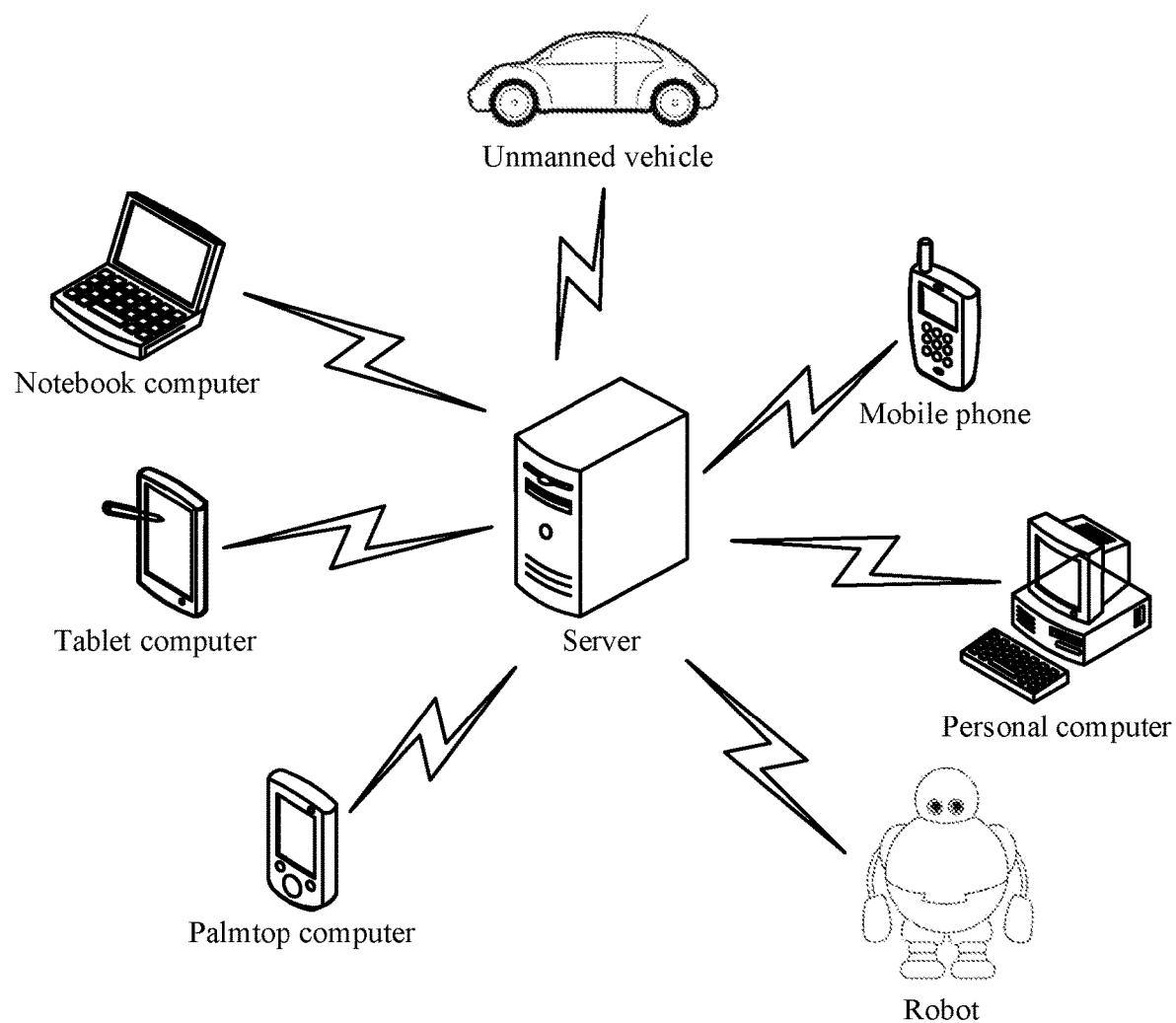
FIG. 2 is a schematic architectural diagram of a target detection system according to an embodiment of the disclosure.

For ease of understanding, the disclosure proposes an image-based target detection method, and the method is applicable to a target detection system. FIG. 2 is a schematic architectural diagram of a target detection system according to an embodiment of the disclosure. As shown in the figure, the model training method proposed by the disclosure is implemented in a server, that is, two sub-network models are introduced into the server in a process of training a cross-domain image detection model. The first sub-network model is a pixel domain adaptation (PDA) network model, and the second sub-network model is a feature domain adaptation (FDA) network model. The PDA network converts an original training set image into an image in a test set style, and a training set image in the test set style obtained after conversion is used as input during model training, thereby facilitating the cross-domain image detection model to adapt to the image in the test set style. The FDA network learns a feature of the image in the test set style at a feature-level constraint model. After the server obtains the cross-domain image detection model through training, a client obtains an image to be detected. The image to be detected herein and the training set image belong to the same domain distribution. Then, the client inputs the image to the cross-domain image detection model obtained by the server through training, the cross-domain image detection model converts a style of the image into a style of a test set image, and ensures a realistic effect of the conversion by using an adversarial learning method, thereby generating the image in the style of the test set image, and enhancing a prediction effect of the cross-domain image detection model on an image in a test set domain.

Moreover, a discriminator is further introduced into the cross-domain image detection model. The discriminator is used for determining whether a feature learned by the cross-domain image detection model comes from the domain of the test set image. Then, it is ensured through adversarial learning that a feature learned by using the image through the cross-domain image detection model is sufficiently similar to a feature of the test set image, so that the discriminator cannot differentiate the two, thereby further ensuring that the style of the image is fully converted into the style of the test set image during detection.

It is to be noted that the client may be deployed on a terminal device. The terminal device includes, but is not limited to, an unmanned vehicle, a robot, a tablet computer, a notebook computer, a palmtop computer, a mobile phone, a speech interaction device, and a personal computer (PC), and is not limited herein.

Figure 3:
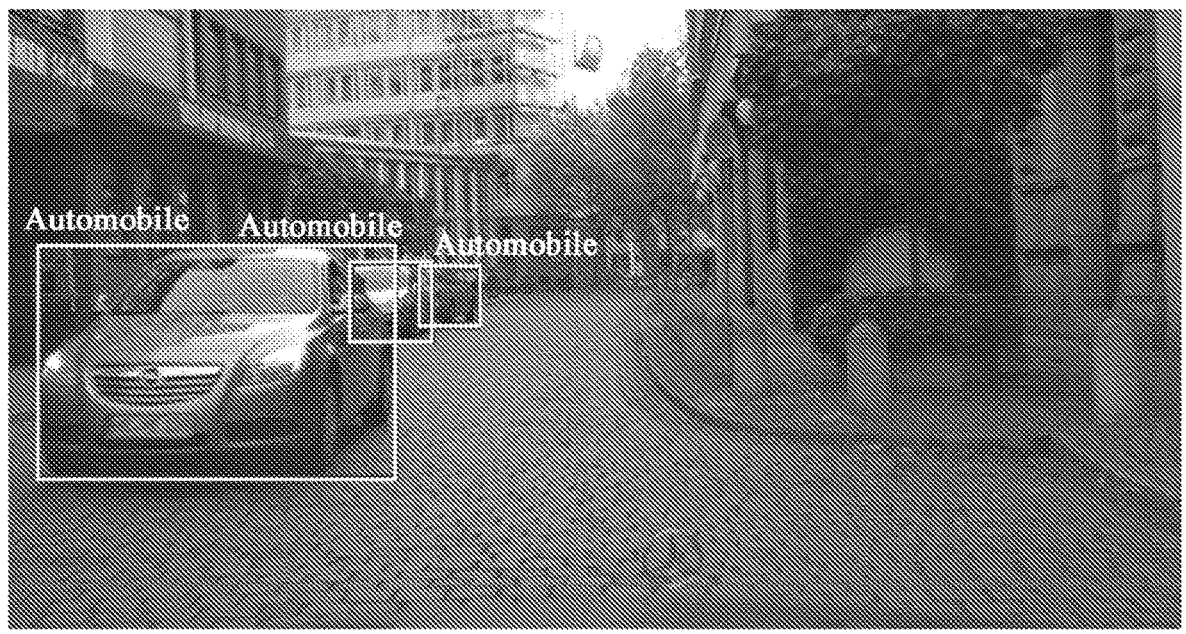
FIG. 3 is a schematic diagram of a target detection effect based on an automated driving system according to an embodiment of the disclosure.
Figure 4:
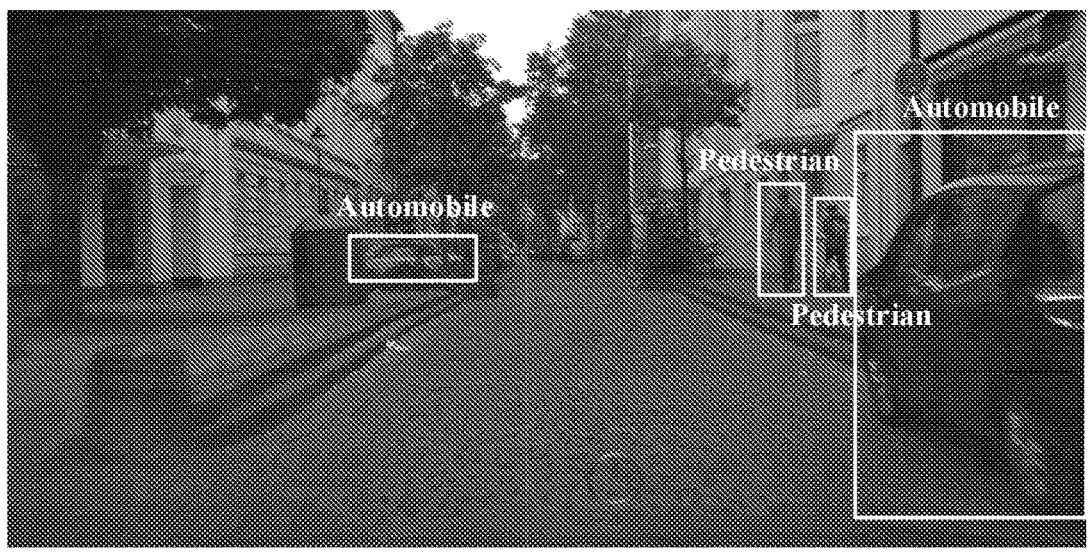
FIG. 4 is a schematic diagram of another target detection effect based on an automated driving system according to an embodiment of the disclosure.

Target detection aims to allocate localization information (for example, bounding box) and class information (for example, class label) to each object (such as a person, a bicycle, a motorcycle, or an automobile) in an image. It is vital to detect other transportation participants in a contemporary automated driving process, and therefore target detection plays an important role in a contemporary automated driving system. The reason is described by using an example of FIG. 3 as follows. FIG. 3 is a schematic diagram of a target detection effect based on an automated driving system according to an embodiment of the disclosure. As shown in the figure, a terminal device may label an image corresponding to FIG. 3 with localization information (that is, bounding box) and class information (that is, "automobile") of an automobile. FIG. 4 is a schematic diagram of another target detection effect based on an automated driving system according to an embodiment of the disclosure. As shown in the figure, a terminal device may label an image corresponding to FIG. 4 with localization information (that is, bounding box) and class information (that is, "automobile" and "pedestrian") of an automobile and a pedestrian.

It is to be understood that, in addition to an unmanned vehicle scenario, the disclosure is further applicable to other scenarios such as a scenario in which a robot performs a task. For example, when a robot performs a dangerous task, it may be very difficult to directly obtain a real test set image in a dangerous scenario, and therefore training needs to be performed through a training set image simulated in the dangerous scenario. By using the model training method provided in the disclosure, the terminal device may convert the style of the training set image into the style of the test set image through adversarial learning, so that it may be ensured, before the cross-domain image detection model learns the feature, that the training set image and the test set image have the same domain distribution as much as possible, and then under the constraint of the adversarial loss function, the feature learned by the cross-domain image detection model based on the training set image may be closer to the feature of the test set image.

Figure 5:
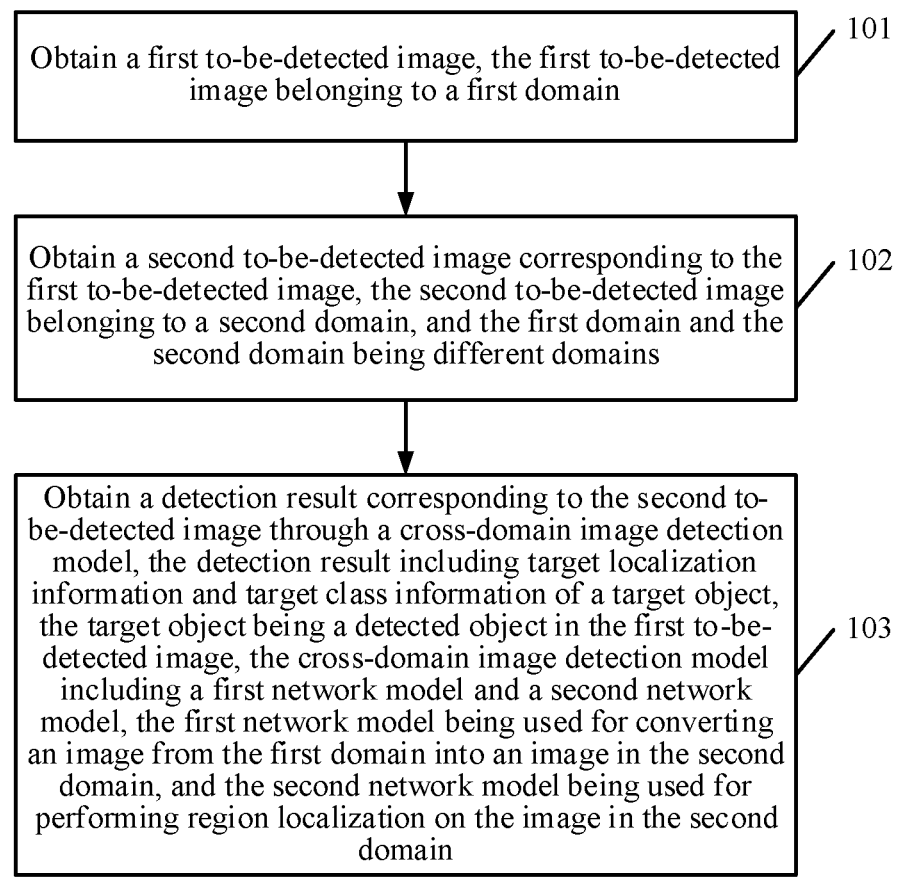
FIG. 5 is a schematic diagram of an embodiment of an image-based target detection method according to an embodiment of the disclosure.

The image-based target detection method in the disclosure is introduced below with reference to the foregoing introduction. Referring to FIG. 5, an embodiment of the image-based target detection method in the embodiments of the disclosure includes the following operations 101-103:

101. A target detection apparatus obtains a first image, the first image belonging to a first domain.

In this embodiment, first, the target detection apparatus obtains the first image to be detected, and the target detection apparatus may be deployed on a terminal device such as a robot or an unmanned vehicle. The first image belongs to the first domain, where the first domain may refer to a specific scenario such as an indoor scenario, or may refer to distribution of a dataset such as a Sim10k dataset. The first image may be an image obtained in real time, for example, captured in real time through a camera of the terminal device, or may be an image extracted from an image database, which is not limited herein.

102. The target detection apparatus obtains a second image to be detected corresponding to the first image, the second image belonging to a second domain, and the first domain and the second domain being different domains.

Figure 6:
FIG. 6 is a schematic diagram of an embodiment of a first image according to an embodiment of the disclosure.
Figure 7:
FIG. 7 is a schematic diagram of an embodiment of a second image according to an embodiment of the disclosure.

In this embodiment, the target detection apparatus may input the first image to a cross-domain image detection model, and a PDA network in the cross-domain image detection model outputs the corresponding second image, the second image belonging to the second domain, and the first domain and the second domain being different domains. In other words, the second image and the first image belong to two different styles. For ease of understanding, FIG. 6 is a schematic diagram of an embodiment of a first image according to an embodiment of the disclosure. As shown in the figure, the first image may be a real image sampled from the Sim10k dataset. After conversion through the PDA network, as shown in FIG. 7, a schematic diagram of an embodiment of a second image according to an embodiment of the disclosure is provided. The second image and the first image are different in style, that is, belong to two domains.

The cross-domain image detection model to be trained may include two parts, that is, a first network model and a second network model, and the two parts are trained by using a target loss function, to separately obtain a final first network model corresponding to the trained first network model and a final second network model corresponding to the trained second network model, where the first network model may include the PDA network, and the second network model may include an FDA network and an object detection network. The PDA network may be used for converting an image in the training style (that is, the first domain) into an image in the test style (that is, the second domain). The FDA network may be used for constraining the style of the image (that is, constraining the style of the image in the second domain after conversion), and the object detection network may be used for performing object detection on the image in the test style.

103. The target detection apparatus obtains a detection result corresponding to the second image through a cross-domain image detection model, the detection result including target localization information and target class information of a target object, the target object being a detected object in the first image, the cross-domain image detection model being capable of including a first network model and a second network model, the first network model being used for converting an image from the first domain into an image in the second domain, and the second network model being used for performing region localization on the image in the second domain.

Figure 8:
FIG. 8 is a schematic diagram of an embodiment of an image on which target localization is to be performed according to an embodiment of the disclosure.

In this embodiment, the target detection apparatus may output the second image through the PDA network in the cross-domain image detection model, then the FDA network in the cross-domain image detection model may convert the second image into an image on which target localization is to be performed, and then the image is detected through the object detection network in the cross-domain image detection model, thereby obtaining the detection result. After the first training image is converted through the PDA network and the FDA network, an image shown in FIG. 8 may be obtained. FIG. 8 is a schematic diagram of an embodiment of an image on which target localization is to be performed according to an embodiment of the disclosure.

Figure 9:
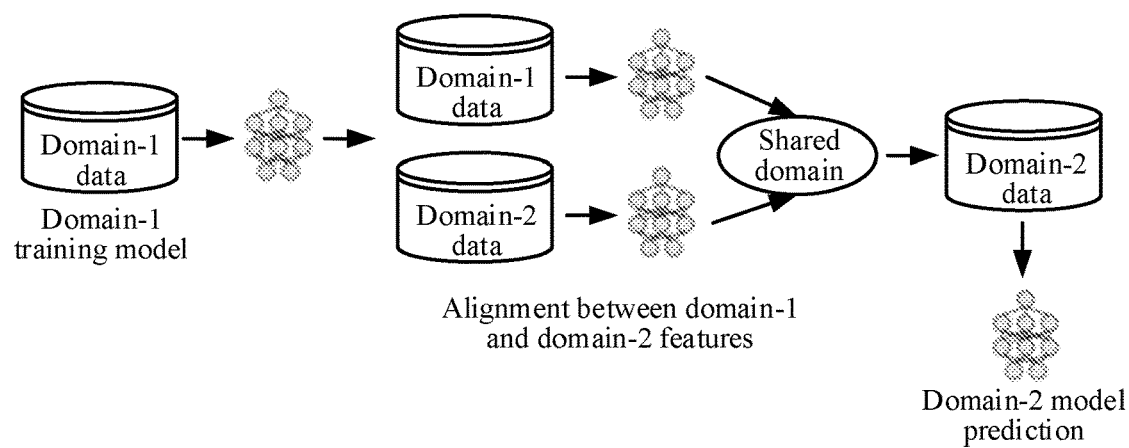
FIG. 9 is a schematic flowchart of deployment of a cross-domain image detection model according to an embodiment of the disclosure.

An application process of the target detection method based on the foregoing introduction is shown in FIG. 9. FIG. 9 is a schematic flowchart of deployment of a cross-domain image detection model according to an embodiment of the disclosure. First, the cross-domain image detection model is pre-trained on a training set image, to obtain a relatively good model initialization weight, where the training set image belongs to a domain 1. Then, training continues by using an adversarial learning method and by using both the labeled training set image and an unknown labeled test set image, where the test set image belongs to a domain 2. After features between the training set image belonging to the domain 1 and the test set image belonging to the domain 2 are aligned, features in the same domain may be shared, to complete prediction on the cross-domain image detection model (model in the domain 2). The cross-domain image detection model provided in the disclosure has relatively high recognition precision on images in the domain 2. A preliminary test result indicates that, with a VGG16 convolutional neural network (CNN) structure, when the training set image comes from the Sim10k dataset and the test set image comes from the Kitti dataset, precision of performing prediction by using a related art technology is about 52.7%, while precision of performing prediction by using the disclosure may be increased up to 59.3%. After the cross-domain image detection model with higher precision is obtained, the cross-domain image detection model may be directly applied to prediction of the test set image.

In this embodiment of the disclosure, the image-based target detection method is provided. The target detection apparatus first obtains the first image, the first image belonging to the first domain; then obtains the second image corresponding to the first image through the cross-domain image detection model, the second image belonging to the second domain; and finally obtains the detection result corresponding to the second image through the cross-domain image detection model, the detection result including the target localization information and the target class information of the target object, and the target object belonging to the first image. Through the foregoing manner, target localization is performed without purposely using an image in a style that is the same as that of a test set image, but the style of the image is converted into the style of the test set image by using the cross-domain image detection model, and then target localization is performed on an image obtained after conversion, thereby improving accuracy of image localization and enhancing a model prediction effect.

Figure 10:
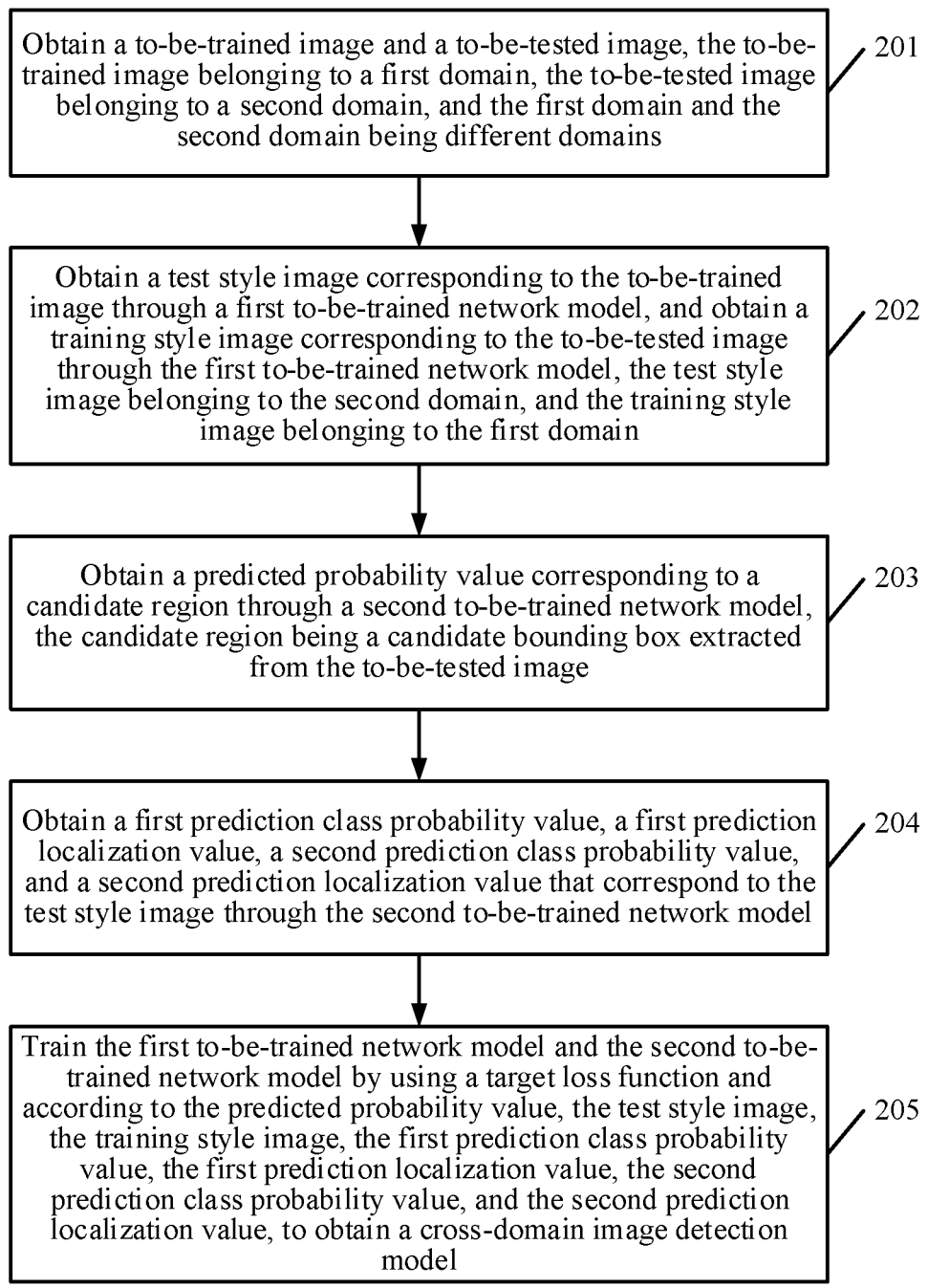
FIG. 10 is a schematic diagram of an embodiment of a model training method according to an embodiment of the disclosure.

The model training method in the disclosure is introduced below with reference to the foregoing introduction. Referring to FIG. 10, an embodiment of the model training method in the embodiments of the disclosure includes the following operations 201-205:

201. A model training apparatus obtains a training image and a test image, the training image belonging to a first domain, the test image belonging to a second domain, and the first domain and the second domain being different domains.

Figure 11:
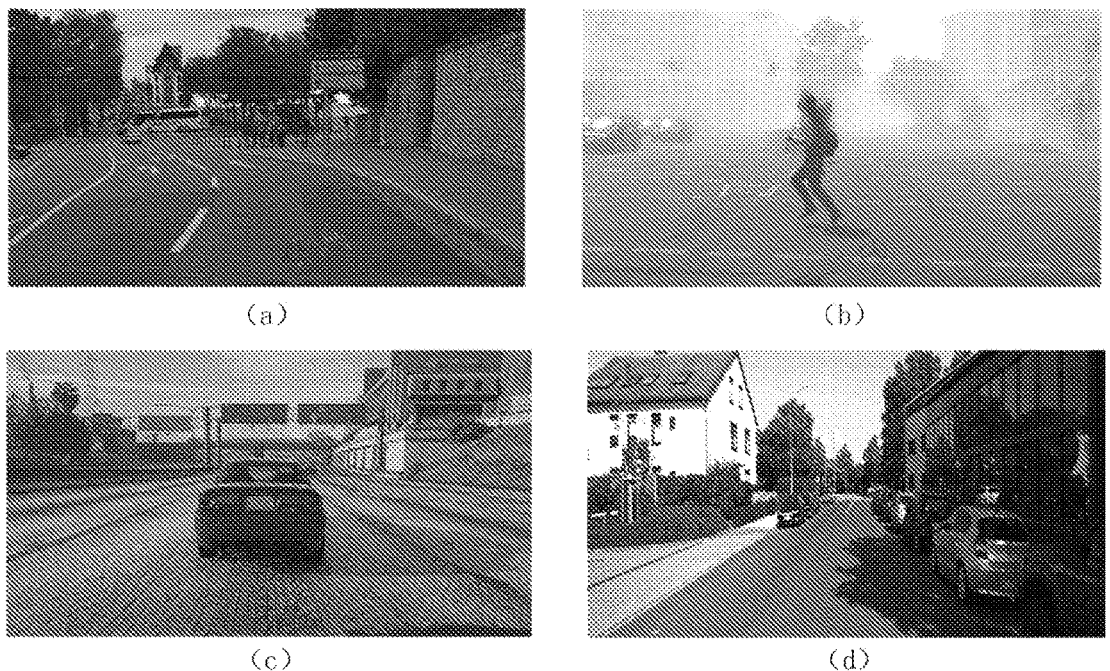
FIG. 11 is a schematic diagram of comparing images in different domains according to an embodiment of the disclosure.

In this embodiment, before model training is performed, the training image and the test image need to be obtained, where the training image and the test image belong to two different domains, that is, the training image belongs to the first domain, and the test image belongs to the second domain. For ease of understanding, FIG. 11 is a schematic diagram of comparing images in different domains according to an embodiment of the disclosure. As shown in the figure, the figure provides images in four different domains, where in FIG. 11, an image (a) represents an image from a Cityscapes dataset, an image (b) represents an image from a Foggy-Cityscapes dataset, an image (c) represents an image from a Sim10k dataset, and an image (d) represents an image from a Kitti dataset, where both the Foggy-Cityscapes dataset and the Sim10k dataset are synthetic datasets for simulating a driving scenario. The Foggy-Cityscapes dataset performs rendering based on a real Cityscapes dataset, to simulate a foggy weather situation. The Kitti dataset is used for performing a benchmark test on different vision tasks in automated driving, for example, deep estimation, three-dimensional matching, scenario or optical estimation, and object detection.

Figure 12:
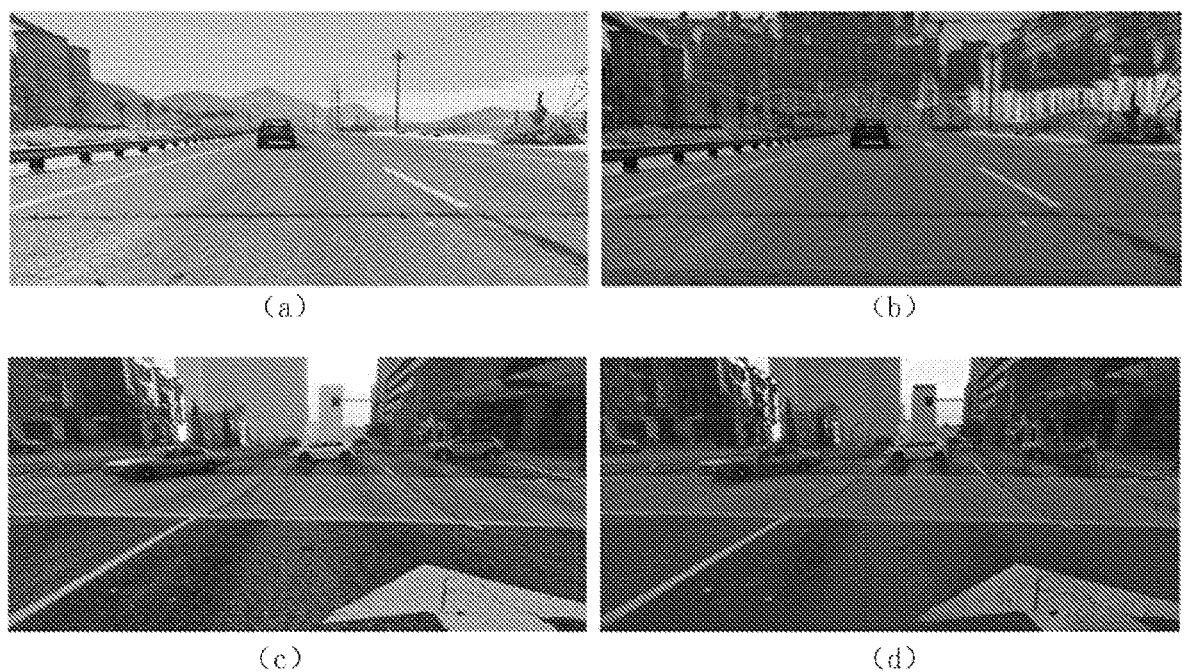
FIG. 12 is a schematic diagram of comparing two classes of images that may be used for training a cross-domain image detection model according to an embodiment of the disclosure.

It would be understood that, the first domain may be the Sim10k dataset, and the second domain may be the Kitti dataset. However, this is not to be understood as a limitation on the disclosure. The first domain may alternatively be the Foggy-Cityscapes dataset, the Cityscapes dataset or the Kitti dataset, and the second domain may alternatively be the Foggy-Cityscapes dataset, the Sim10k dataset or the Cityscapes dataset, as long as it is ensured the first domain and the second domain are different. Also, domains are not limited to the examples shown in FIG. 11. Description is made below by using an example in which the first domain is the Sim10k dataset and the second domain is the Kitti dataset. FIG. 12 is a schematic diagram of comparing two classes of images that may be used for training a cross-domain image detection model according to an embodiment of the disclosure. As shown in the figure, in FIG. 12, an image (a) and an image (c) represent images from the Sim10k dataset, and an image (b) and an image (d) represent images from the Kitti dataset.

202. The model training apparatus obtains a test style image corresponding to the training image through a first network model, and obtains a training style image corresponding to the test image through the first network model, the test style image belonging to the second domain, and the training style image belonging to the first domain.

In this embodiment, the model training apparatus may input the training image to the first network model (which may be, for example, a to-be-trained PDA network), the first network model outputs the test style image; and similarly, the model training apparatus inputs the test image to the first network model, and the first network model outputs the training style image.

Figure 13:
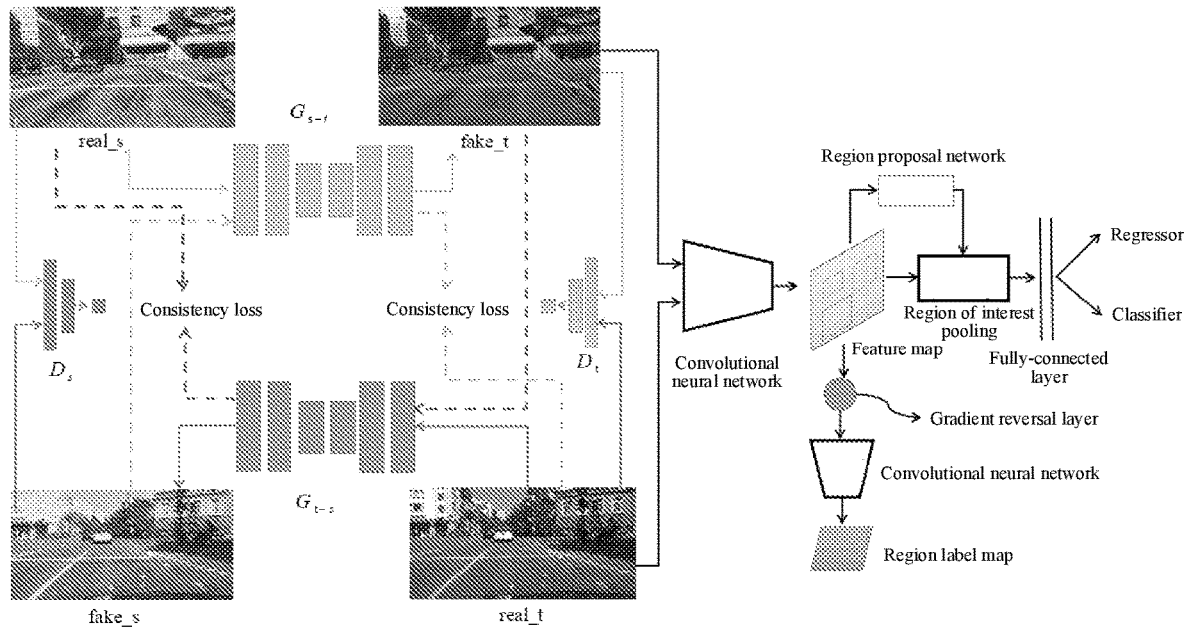
FIG. 13 is a schematic structural diagram of a cross-domain image detection model according to an embodiment of the disclosure.

In a possible implementation, for ease of description, FIG. 13 is a schematic structural diagram of a cross-domain image detection model according to an embodiment of the disclosure. As shown in the figure, in FIG. 13, a left part is a model structure of a PDA network, the model structure is used for converting an image in a source domain style into an image in a target domain style before an FDA network is trained, and a cycle generative adversarial network (Cycle-GAN) may be used as the PDA network. A right part is a model structure of the FDA network, the model structure is used for feature-level adversarial training, and an object detection part enhances several additional neural layers. It is assumed that a training image (real_s) is converted through the first network model (e.g., the to-be-trained PDA network) into a test style image (fake_t); and a test image (real_t) is converted through the first network model (e.g., the to-be-trained PDA network) into a training style image (fake_s), where the test style image (fake_t) and the test image (real_t) belong to the same domain, and the training style image (fake_s) and the training image (real_s) belong to the same domain.

203. The model training apparatus obtains a predicted probability value corresponding to a candidate region through a second network model, the candidate region being a candidate bounding box extracted from the test image or the test style image.

In this embodiment, based on the foregoing introduction, after the first network model (e.g., the to-be-trained PDA network) converts the training image (real_s) into the test style image (fake_t), the test style image is directly fed into the FDA network in the second network model, the model training apparatus inputs the test style image (fake_t) and the test image (real_t) to a discriminator in the FDA network, to determine features in all locations in the test style image (fake_t) and the test image (real_t), that is, predict a probability value for a candidate bounding box (bbox) from the test image or from the test style image, thereby obtaining a predicted probability value corresponding to a candidate region.

204. The model training apparatus obtains a first prediction class probability value, a first prediction localization value, a second prediction class probability value, and a second prediction localization value that correspond to the test style image through the second network model.

In this embodiment, based on the foregoing introduction, the model training apparatus may input the test style image (fake_t) to the second network model, and the first prediction class probability value, the first prediction localization value, the second prediction class probability value, and the second prediction localization value are outputted through the second network model, where an object detection network in the cross-domain image detection model may include two parts, namely, a region proposal network (RPN) and a target detection network, the first prediction class probability value and the first prediction localization value are prediction values outputted by the RPN, and the second prediction class probability value and the second prediction localization value are prediction values outputted by the target detection network.

The object detection network is used for performing feature learning and target detection. The object detection network may be a faster region-based convolutional neural network (R-CNN), a region-based fully convolutional network (R-FCN), or the like.

205. The model training apparatus trains the first network model and the second network model by using a target loss function and according to the predicted probability value, the test style image, the training style image, the first prediction class probability value, the first prediction localization value, the second prediction class probability value, and the second prediction localization value, to obtain a cross-domain image detection model.

In this embodiment, the model training apparatus may train the first network model and the second network model by using the target loss function and with reference to the predicted probability value, the test style image, the training style image, the first prediction class probability value, the first prediction localization value, the second prediction class probability value, and the second prediction localization value, to obtain the cross-domain image detection model, and the cross-domain image detection model may convert the image in the first domain into the image in the second domain and then perform training, or may detect localization information and class information for the image in the first domain. Specifically, the first network model may include the to-be-trained PDA network, the second network model may include the FDA network and the object detection network, and the object detection network may include the RPN and the target detection network.

Figure 14:
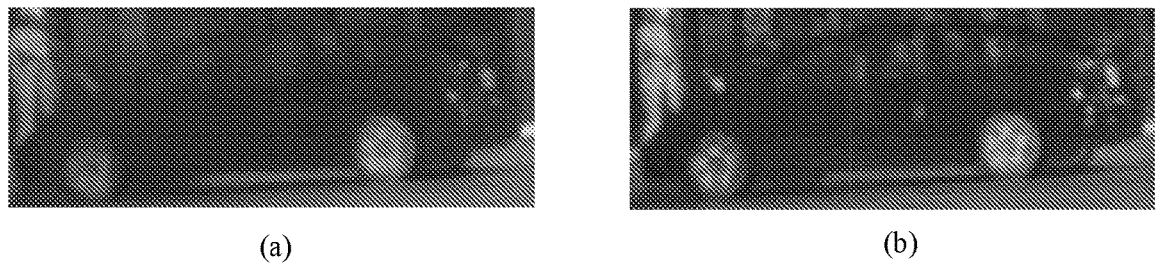
FIG. 14 is a schematic diagram of an image comparison detected in an experimental result according to an embodiment of the disclosure.
Figure 15:
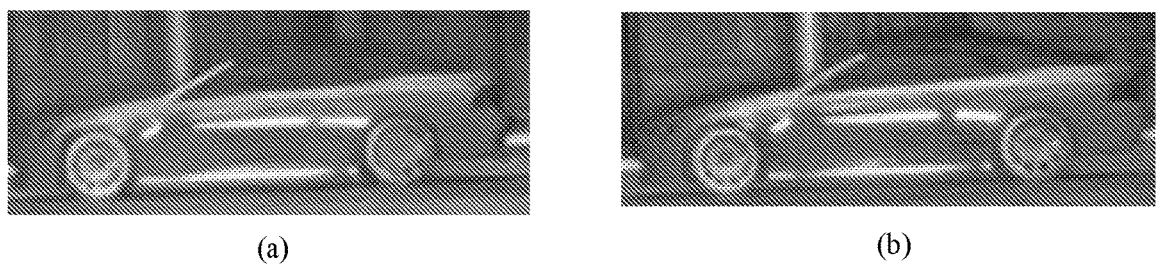
FIG. 15 is a schematic diagram of another image comparison detected in an experimental result according to the disclosure.

For ease of description, FIG. 14 is a schematic diagram of an image comparison detected in an experimental result according to an embodiment of the disclosure. As shown in the figure, in FIG. 14, an image (a) shows a vehicle obtained through conversion of the PDA network, and an image (b) shows a vehicle obtained through conversion of the PDA network and the FDA network. It is shown that, reproducibility and definition of the vehicle in the image (b) are higher than reproducibility and definition of the vehicle in the image (a). FIG. 15 is a schematic diagram of another image comparison detected in an experimental result according to the disclosure. As shown in the figure, in FIG. 15, an image (a) shows a vehicle obtained through conversion of the PDA network, and an image (b) shows a vehicle obtained through conversion of the PDA network and the FDA network. It shown that, reproducibility and definition of the vehicle in the image (b) are likewise higher than reproducibility and definition of the vehicle in the image (a).

In this embodiment of the disclosure, the model training method is provided. The model training apparatus first obtains the training image and the test image; then obtains the test style image corresponding to the training image through the first network model, obtains the training style image corresponding to the test image through the first network model, obtains the predicted probability value corresponding to the candidate region through the second network model, and obtains the first prediction class probability value, the first prediction localization value, the second prediction class probability value, and the second prediction localization value corresponding to the test style image through the second network model; and finally trains the first network model and the second network model by using the target loss function, to obtain the cross-domain image detection model. Through the foregoing manner, the cross-domain image detection model obtained through training may implement cross-domain image conversion, the style of the training set image may be converted into the style of the test set image by using the cross-domain image detection model, and then target localization is performed on an image obtained after conversion, thereby improving accuracy of image localization and enhancing a model prediction effect.

In an embodiment, based on the embodiment corresponding to FIG. 10, in a first optional embodiment of the model training method according to the embodiments of the disclosure, the training, by the model training apparatus, the first network model and the second network model by using a target loss function and according to the predicted probability value, the test style image, the training style image, the first prediction class probability value, the first prediction localization value, the second prediction class probability value, and the second prediction localization value may include:

determining a first loss function according to the test style image and the training style image;

determining a second loss function according to the predicted probability value;

determining a third loss function according to the first prediction class probability value, the first prediction localization value, the second prediction class probability value, and the second prediction localization value;

generating the target loss function according to the first loss function, the second loss function, and the third loss function; and training the first network model and the second network model by using the target loss function.

In this embodiment, formation content of the target loss function is introduced. First, after the model training apparatus obtains the test style image and the training style image, the first loss function may be determined according to the training image, the test image, the test style image, and the training style image. Next, the model training apparatus may determine the second loss function according to the predicted probability value corresponding to the test image or the test style image. Finally, the model training apparatus may train the RPN according to the first prediction class probability value, the first real class probability value, the first prediction localization value, and the first real localization value generated by the RPN, and meanwhile train the target detection network according to the second prediction class probability value, the second real class probability value, the second prediction localization value, and the second real localization value generated by the target detection network. That is, the model training apparatus generates the third loss function according to the first prediction class probability value, the first real class probability value, the first prediction localization value, the first real localization value, the second prediction class probability value, the second real class probability value, the second prediction localization value, and the second real localization value.

The model training apparatus may obtain the target loss function with reference to the first loss function, the second loss function, and the third loss function, and train the first network model and the second network model by using the target loss function.

Secondly, in this embodiment of the disclosure, a method for obtaining the target loss function is provided, that is, determining the first loss function according to the test style image and the training style image; then determining the second loss function according to the predicted probability value; then determining the third loss function according to the first prediction class probability value, the first prediction localization value, the second prediction class probability value, and the second prediction localization value; and finally generating the target loss function, and training the first network model and the second network model by using the target loss function. Through the foregoing manner, a model training process may be divided into three parts which are correspondingly trained by using three loss functions respectively, thereby improving flexibility and operability of training.

In an embodiment, based on the first embodiment corresponding to FIG. 10, in a second optional embodiment of the model training method according to the embodiments of the disclosure, the determining, by the model training apparatus, a first loss function according to the test style image and the training style image may include:

determining the first loss function in the following manner:

$$L_{cyc}(G_{t\text{-}s}, G_{s\text{-}t}) = E_{t\sim X(t)}[\|G_{s\text{-}t}(G_{t\text{-}s}(x_t)) - x_t\|] + E_{s\sim X(s)}[\|G_{t\text{-}s}(G_{s\text{-}t}(x_s)) - x_s\|] L_{cyc}(G_{t\text{-}s}, G_{s\text{-}t}) = E_{t\sim X(t)}[\|G_{s\text{-}t}(G_{t\text{-}s}(x_t)) - x_t\|] + E_{s\sim X(s)}[\|G_{t\text{-}s}(G_{s\text{-}t}(x_s)) - x_s\|],$$

where $L_{cyc}(G_{t\text{-}s}, G_{s\text{-}t})$ represents the first loss function, $x_t$ represents the test image, $x_s$ represents the training image, $G_{s\text{-}t}$ represents a generator for converting the training image into the test style image, $G_{t\text{-}s}$ represents a generator for converting the test image into the training style image, $G_{t\text{-}s}(x_t)$ represents the training style image, $G_{s\text{-}t}(x_s)$ represents the test style image, $E_{s\sim X(s)}$ represents calculating an expected value of each training image in a training image set, and $E_{t\sim X(t)}$ represents calculating an expected value of each test image in a test image set.

In this embodiment, the first network model may be trained based on learning from the CycleGAN. A conventional GAN is unidirectionally generated, while the CycleGAN is mutually generated and the network is a ring. The CycleGAN is actually a unidirectional GAN from A to B plus a unidirectional GAN from B to A. The two GANs share two generators and are each provided with a discriminator, and therefore there are a total of two discriminators and two generators. One unidirectional GAN has two losses, while the CycleGAN has a total of four losses. In the disclosure, losses of the discriminators may be separately calculated, and losses of the generators may be calculated in combination, thereby obtaining the following first loss function:

$$L_{cyc}(G_{t\text{-}s}, G_{s\text{-}t}) = E_{t\sim X(t)}[\|G_{s\text{-}t}(G_{t\text{-}s}(x_t)) - x_t\|] + E_{s\sim X(s)}[\|G_{t\text{-}s}(G_{s\text{-}t}(x_s)) - x_s\|],$$

where $L_{cyc}(G_{t\text{-}s}, G_{s\text{-}t})$ represents the first loss function, $x_t$ represents the test image, $x_s$ represents the training image, $G_{s\text{-}t}$ represents a generator for converting the training image into the test style image, $G_{t\text{-}s}$ represents a generator for converting the test image into the training style image, $G_{t\text{-}s}(x_t)$ represents the training style image, $G_{s\text{-}t}(x_s)$ represents the test style image, $E_{s\sim X(s)}$ represents calculating an expected value of each training image in a training image set, and $E_{t\sim X(t)}$ represents calculating an expected value of each test image in a test image set.

It would be understood that, $G_{t\text{-}s}$ and $G_{s\text{-}t}$ are used as transformation networks, which may be any deep convolutional neural network model such as a VGG network or a residual neural network (ResNet). In the disclosure, a generator may be divided into two parts such as $G_{s\text{-}t}$ and $G_{t\text{-}s}$ shown in FIG. 13, where the first generator $G_{s\text{-}t}$ is used for converting the original training image into the test style image, and the second generator $G_{t\text{-}s}$ is used for converting the test image into the training style image.

In actual application, a GAN may alternatively learn mapping functions $G_{t\text{-}s}$ and $G_{s\text{-}t}$ to generate images sampled from data distribution of the test image and data distribution of the training image. However, if the GAN is used, structure information of a source image may be lost. To resolve the foregoing problem, an image generated by $G_{s\text{-}t}$ may be forced, by using the first loss function with cycle consistency, to have the same image effect as that of an image generated by $G_{t\text{-}s}$ and vice versa.

Next, in this embodiment of the disclosure, an illustrative manner of determining a first loss function according to the test style image and the training style image is provided. Through the foregoing manner, the image style may be migrated from the source domain to the target domain without paired training data, and when the first network model is trained, it is only required that the image in the source domain and the image in the target domain are used as input, and it is not required that image content in the source domain matches that in the target domain, thereby having flexibility. Moreover, use of the first loss function may ensure that the training set image after two times of conversion is the same as or similar to the initial training set image as much as possible, and the test set image after two times of conversion is also the same as or similar to the initial test set image as much as possible.

In an embodiment, based on FIG. 10 and the first or second embodiment corresponding to FIG. 10, in a third optional embodiment of the model training method according to the embodiments of the disclosure, after the obtaining, by the model training apparatus, a test style image corresponding to the training image through a first network model, and obtaining a training style image corresponding to the test image through the first network model, the method may further include:

performing reality detection on the test style image through a first discriminator, where the first discriminator is a discriminator obtained based on training by using a first adversarial loss function; and performing reality detection on the training style image through a second discriminator, where the second discriminator is a discriminator obtained based on training by using a second adversarial loss function.

In this embodiment, how to train the first network model by using a discriminator is introduced. The discriminator may be used for determining a result generated by a generator and a real (or actual) result, aiming to make the generated result closer to the real result, to achieve an objective of "mixing the false with the genuine". For example, for the test image, the first discriminator determines that a label thereof is 1, and for the test style image, the first discriminator determines that a label thereof is 0, where 1 represents that the image determined by the first discriminator is an image in a real test set, and 0 represents that the image determined by the first discriminator is an image into which a training set picture is converted. In another example, for the training image, the second discriminator determines that a label thereof is 1, and for the training style image, the second discriminator determines that a label thereof is 0, where 1 represents that the image determined by the second discriminator is an image in the original training set, and 0 represents that the image determined by the second discriminator is an image into which a test set picture is converted.

In other words, the first discriminator may be used for distinguishing whether the image obtained through conversion is the real test set image, or the test style image into which the training image is converted. The second discriminator may be used for distinguishing whether the image is the original training set image, or the training style image obtained through conversion.

Further, in this embodiment of the disclosure, after the obtaining a test style image corresponding to the training image through a first network model, and obtaining a training style image corresponding to the test image through the first network model, the following may be further provided: Reality detection is performed on the test style image through a first discriminator, and reality detection is performed on the training style image through a second discriminator. Through the foregoing manner, the model training apparatus may perform, by using discriminators, reality recognition on images generated by generators, thereby facilitating an improvement in a model training effect.

In an embodiment, based on the third embodiment corresponding to FIG. 10, in a fourth optional embodiment of the model training method according to the embodiments of the disclosure, before the performing, by the model training apparatus, reality detection on the test style image through a first discriminator, the method may further include:

obtaining the first adversarial loss function in the following manner:

$$L_{GAN}(D_t, G_{s\text{-}t}) = E_{t\sim X(t)}[\log D_t(x)] + E_{s\sim X(s)}[\log(1 - D_t(G_{s\text{-}t}(s)))],$$

where $L_{GAN}(D_t, G_{s\text{-}t})$ represents the first adversarial loss function, $E_{s\sim X(s)}$ represents calculating an expected value of each training image in a training image set, $E_{t\sim X(t)}$ represents calculating an expected value of each test image in a test image set, $D_t( )$ represents the first discriminator, s represents an image in the first domain, $G_{s-t}( )$ represents a network for converting the image in the first domain into an image in the second domain, and x represents an inputted image.

In this embodiment, for ease of introduction, still referring to FIG. 13, after fake images are generated in two domains respectively by using $G_{s-t}$ and $G_{t-s}$, two discriminators, that is, the first discriminator $D_t$ and the second discriminator $D_s$ need to be trained, to distinguish between real images and fake images. The generators always attempt to generate images from which it would be difficult for the discriminators to distinguish real images, and the trained discriminators may be trained to classify real images and fake images.

Therefore, training is performed by using the following first adversarial loss function of the first discriminator:

$$L_{GAN}(D_t, G_{s-t}) = E_{t \sim X(t)}[\log D_t(x)] + E_{s \sim X(s)}[\log(1 - D_t(G_{s-t}(s)))],$$

where $L_{GAN}(D_t, G_{s-t})$ represents the first adversarial loss function, $E_{s \sim X(s)}$ represents calculating an expected value of each training image in a training image set, $E_{t \sim X(t)}$ represents calculating an expected value of each test image in a test image set, $D_t( )$ represents the first discriminator, s represents an image in the first domain, $G_{s-t}( )$ represents a network for converting the image in the first domain into an image in the second domain, and x represents an inputted image.

Still further, in this embodiment of the disclosure, before the performing reality detection on the test style image through a first discriminator, the following may be further provided: The first adversarial loss function is obtained, and a model effect is determined through the first adversarial loss function. Through the foregoing manner, an image transformed from the first domain to the second domain may be made closer to an image in the second domain, thereby improving feasibility of the solution.

In an embodiment, based on the third embodiment corresponding to FIG. 10, in a fifth optional embodiment of the model training method according to the embodiments of the disclosure, before the performing, by the model training apparatus, reality detection on the training style image through a second discriminator, the method may further include:

obtaining the second adversarial loss function in the following manner:

$$L_{GAN}(D_t, G_{s-t}) = E_{t \sim X(t)}[\log D_t(x)] + E_{t \sim X(t)}[\log(1 - D_t(G_{t-s}(t)))],$$

where $L_{GAN}(D_s, G_{t-s})$ represents the second adversarial loss function, $E_{s \sim X(s)}$ represents calculating an expected value of each training image in a training image set, $E_{t \sim X(t)}$ represents calculating an expected value of each test image in a test image set, $D_s( )$ represents the second discriminator, t represents an image in the second domain, $G_{t-s}( )$ represents a network for converting the image in the second domain into an image in the first domain, and x represents an inputted image.

In this embodiment, for ease of introduction, still referring to FIG. 13, after fake images are generated in two domains respectively by using $G_{s-t}$ and $G_{t-s}$, two discriminators, that is, the first discriminator $D_t$ and the second discriminator $D_s$ need to be trained, to distinguish between real images and fake images. The generators always attempt to generate images from which it would be difficult for the discriminators to distinguish real images, and the trained discriminators may be trained to classify real images and fake images.

Therefore, training is performed by using the following second adversarial loss function of the first discriminator:

$$L_{GAN}(D_t, G_{s-t}) = E_{t \sim X(t)}[\log D_s(x)] + E_{t \sim X(s)}[\log(1 - D_s(G_{t-s}(t)))],$$

where $L_{GAN}(D_s, G_{t-s})$ represents the second adversarial loss function, $E_{s \sim X(s)}$ represents calculating an expected value of each training image in a training image set, $E_{t \sim X(t)}$ represents calculating an expected value of each test image in a test image set, $D_s( )$ represents the second discriminator, t represents an image in the second domain, $G_{t-s}( )$ represents a network for converting the image in the second domain into an image in the first domain, and x represents an inputted image.

Still further, in this embodiment of the disclosure, before the performing reality detection on the training style image through a second discriminator, the following may be further provided: The second adversarial loss function is obtained, and a model effect is determined through the second adversarial loss function. Through the foregoing manner, an image transformed from the second domain to the first domain may be made closer to an image in the first domain, thereby improving feasibility of the solution.

In an embodiment, based on the first embodiment corresponding to FIG. 10, in a sixth optional embodiment of the model training method according to the embodiments of the disclosure, the determining, by the model training apparatus, a second loss function according to the predicted probability value may include:

determine the second loss function in the following manner:

$$L_{domain} = -\Sigma_{i,j}[d \log p_{i,j} + (1-d)\log(1-p_{i,j})],$$

where L domain represents the second loss function, low represents a predicted probability value of an $j^{th}$ candidate region on a $j^{th}$ class, and d represents an image source value.

In this embodiment, after the training image is converted into the test style image, the test style image is inputted to the object detection network to perform feature learning and target detection. A feature learned by an intermediate layer of the object detection network is inputted to a discriminator corresponding to an FDA network, and the discriminator is used for determining whether the feature comes from the real test image, or the test style image into which the training image is converted. The second loss function used during training is:

$$L_{domain} = -\Sigma_{i,j}[d \log p_{i,j} + (1-d)\log(1-p_{i,j})],$$

where $L_{domain}$ represents the second loss function, $p_{i,j}$ represents a predicted probability value of an $i^{th}$ candidate region on a $j^{th}$ class, and d represents an image source value. The second loss function determines features in all locations. When the feature comes from the real test image, d=1, and when the feature comes from the test style image obtained through conversion, d=0. $p_{i,j}$ represents the predicted probability value of the $i^{th}$ candidate region on the $j^{th}$ class. That is, When the feature comes from the real test image, j=0, and when the feature comes from the test style image obtained through conversion, j=1.

Further, in this embodiment, an illustrative manner of determining the second loss function according to the predicted probability value is provided. Through the foregoing manner, whether a feature of an image comes from the real test set image, or the test style image into which the training set image is converted may be determined, thereby making the image outputted by the model closer to the actual image.

In an embodiment, based on the first embodiment corresponding to FIG. 10, in a seventh optional embodiment of the model training method according to the embodiments of the disclosure, the determining a third loss function according to the first prediction class probability value, the first prediction localization value, the second prediction class probability value, and the second prediction localization value may include:

determining the third loss function in the following manner:

$$L_{det}(p,u,t^m,v)=L_{rpn\text{-}cls}(p_{rpn},u_{rpn})+L_{rpn\text{-}loc}(t_{rpn}^m,v_{rpn})+L_{obj\text{-}cls}(p_{obj},u_{obj})+L_{obj\text{-}loc}(t_{obj}^m,v_{obj}),$$

where $L(p, u, t^m, v)_{det}$ represents the third loss function, $L_{rpn\text{-}cls}$ represents a classification loss function of a region proposal network (RPN) in the second network model, $p_{rpn}$ represents the first prediction class probability value of the RPN, $u_{rpn}$ represents a first real class probability value of the RPN, $L_{rpn\text{-}loc}$ represents a localization loss function of the RPN in the second network model, $t_{rpn}^m$ represents the first prediction localization value of the RPN, $v_{rpn}$ represents a first real localization value of the RPN, $L_{obj\text{-}cls}$ represents a classification loss function of a target detection network in the second network model, pow represents the second prediction class probability value of the target detection network, $u_{obj}$ represents a second real class probability value of the target detection network, $L_{obj\text{-}loc}$ represents a localization loss function of the target detection network in the second network model, $t_{obj}^m$ represents the second prediction localization value of the target detection network, and Vow represents a second real localization value of the target detection network.

In this embodiment, the training manner of the object detection network is introduced. The object detection network being a faster R-CNN is used as an example for description, and a detection loss function of the faster R-CNN is as follows:

$$L_{det}(p,u,t^m,v)=L_{rpn\text{-}cls}(p_{rpn},u_{rpn})+L_{rpn\text{-}loc}(t_{rpn}^m,v_{rpn})+L_{obj\text{-}cls}(p_{obj},u_{obj})+L_{obj\text{-}loc}(t_{obj}^m,v_{obj}),$$

where $L(p, u, t^m, v)_{det}$ represents the third loss function, $L_{rpn\text{-}cls}$ represents a classification loss function of a region proposal network (RPN) in the second network model, $p_{rpn}$ represents the first prediction class probability value of the RPN, $u_{rpn}$ represents a first real class probability value of the RPN, $L_{rpn\text{-}loc}$ represents a localization loss function of the RPN in the second network model, $t_{rpn}^m$ represents the first prediction localization value of the RPN, $v_{rpn}$ represents a first real localization value of the RPN, $L_{obj\text{-}cls}$ represents a classification loss function of a target detection network in the second network model, $p_{obj}$ represents the second prediction class probability value of the target detection network, $u_{obj}$ represents a second real class probability value of the target detection network, $L_{obj\text{-}loc}$ represents a localization loss function of the target detection network in the second network model, $t_{obj}^m$ represents the second prediction localization value of the target detection network, and Vow represents a second real localization value of the target detection network.

In a possible implementation, assuming that there are m classes of target detection tasks, a region classification layer outputs (m+1)-dimensional probability distribution, p=(p0, p1, . . . pm), where a class used for the background is included. A real value $t^m$ is predicted for each possible class through a bounding box regression layer. A classification loss may be calculated and a loss L1 may be smoothed by using cross entropy, and through domain class learning, it is assumed that through classification, a label of the test style image (fake_t) is set to d=0 and a label of the test image (real_t) is set to d=1.

Further, in this embodiment of the disclosure, a method for determining a third loss function according to the first prediction class probability value, the first prediction localization value, the second prediction class probability value, and the second prediction localization value is provided. Through the foregoing manner, a specific implementation may be provided for model training, thereby improving feasibility and operability of the solution.

In an embodiment, based on the first embodiment corresponding to FIG. 10, in an eighth optional embodiment of the model training method according to the embodiments of the disclosure, the generating, by the model training apparatus, the target loss function according to the first loss function, the second loss function, and the third loss function may include:

determining the target loss function in the following manner:

$$L=L_{cyc}(G_{t\text{-}s}, G_{s\text{-}t})+L_{domain}+L_{det},$$

where L represents the target loss function, $L_{cyc}(G_{t\text{-}s}, G_{s\text{-}t})$ represents the first loss function, $L_{domain}$ represents the second loss function, and $L_{det}$ represents the third loss function.

In this embodiment, based on the foregoing introduction to the first loss function, the second loss function, and the third loss function, the target loss function may be obtained:

$$L=L_{cyc}(G_{t\text{-}s}, G_{s\text{-}t})+L_{domain}+L_{det}; \text{ and}$$

to be more comprehensible, and to better control importance between loss functions, the following completely trained target loss function may be obtained:

$$L_{full}=\lambda_1 L2_{domain_3}(L_{cyc}+L_{GAN}(D_s,G_{t\text{-}s})+L_{GAN}(D_t, G_{s\text{-}t}))_{det}; \text{ and}$$

based on the foregoing formula, $L_{full}$ represents the completely trained target loss function, and $\lambda_1$, $\lambda_2$, and $\lambda_3$ respectively represent three weight coefficients, used for balancing different losses.

Under the constraint from an internal memory of a graphics processing unit (GPU), at a training stage, the model training apparatus may scale the height of an image to 512 pixels, and then crop the scaled image into 512×512 image blocks, to implement pixel-level self-adaptation. In consideration of stability of the training process and quality of the image, the model training apparatus may replace an adversarial loss log-likelihood target with a least squares GAN target. In a possible implementation, the model training apparatus may perform end-to-end training based on the first network model and the second network model. At an initial training stage of the first network model (e.g., the to-be-trained PDA network), most generated images have relatively large noise. Therefore, the first network model (e.g., the to-be-trained PDA network) may be trained by using an Adam optimizer, an initial learning rate thereof may be set to 0.0002, and after 30 times of iterative training, the learning rate is reduced to 0 during the 30 times of iterative training. The model training apparatus may train the second network model (e.g., to-be-trained the FDA network) by using a standard stochastic gradient descent (SGD) algorithm, an initial learning rate thereof may be set to 0.001. After 6 times of iterative training, the learning rate is reduced to 0.0001, and 3 times of iterative training continue to be performed.

For end-to-end training, the aforementioned learning rates are both reduced 10 times, then the PDA network and the FDA network are fine-tuned in a quantity of iteration times, $\lambda_1=130$, $\lambda_2=0.5$, $\lambda_3=0.5$, a Tesla M40 GPU with a 24-gigabyte (GB) internal memory is used for network training in the disclosure, and the following result may be obtained. Table 1 shows an analysis detection result obtained by using Sim10k as a training dataset and using Cityscapes as a test dataset.

TABLE 1

| | PDA Network | FDA Network | PDA + FDA Network | Model Performance Indicator (%) |
|---|---|---|---|---|
| Faster R-CNN | — | — | — | 30.1 |
| State Of The Art | — | — | — | 38.97 |
| Model In The disclosure | √ | — | — | 37.8 |
| Model In The disclosure | — | √ | — | 33.8 |
| Model In The disclosure | √ | √ | √ | 39.6 |
| Oracle Teacher Network | — | — | — | 48.3 |

It can be seen from above that, because oracle refers to a model obtained by directly performing training in a domain 2 corresponding to a test set, the model performance indicator is highest, and the model performance of the PDA network+FDA network provided in the disclosure is best (e.g., for cross-domain detection).

Further, in this embodiment of the disclosure, an illustrative manner of determining the target loss function is provided. Through the foregoing manner, the target loss function generated with reference to three loss functions may better control training of the cross-domain image detection model, thereby improving reliability and operability of training.

Figure 16:
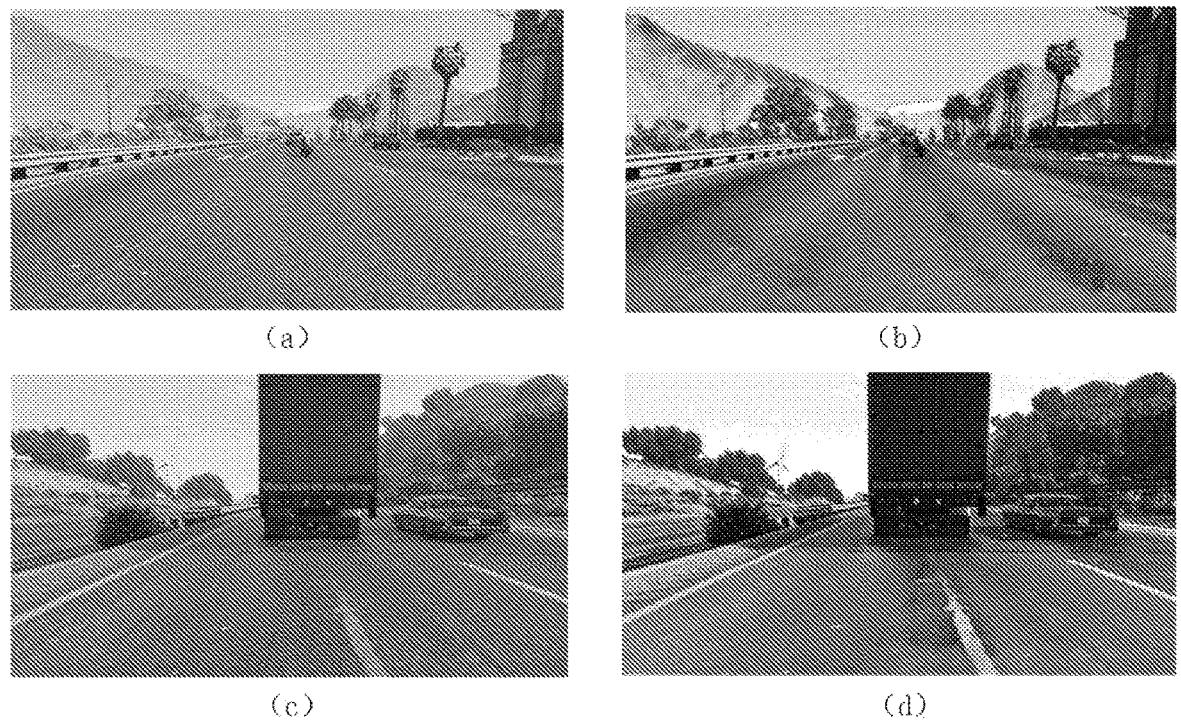
FIG. 16 is a schematic diagram of an effect of conversion from a Sim10k dataset to a Kitti dataset in an experimental result according to the disclosure.

For ease of introduction, a model provided in the disclosure is introduced below with reference to an experimental result in an automated driving environment. FIG. 16 is a schematic diagram of an effect of conversion from a Sim10k dataset to a Kitti dataset in an experimental result according to the disclosure. As shown in the figure, an image (a) and an image (c) in FIG. 16 come from the Sim10k dataset, and an image (b) and an image (d) in FIG. 16 come from the Kitti dataset. Table 2 shows an evaluation detection result obtained by using the Sim10k dataset as a source dataset on the Kitti dataset.

TABLE 2

| | PDA Network | FDA Network | PDA + FDA Network | Model Performance Indicator (%) |
|---|---|---|---|---|
| Faster R-CNN | — | — | — | 52.7 |
| Model In The disclosure | √ | — | — | 58.4 |
| Model In The disclosure | — | √ | — | 55.3 |
| Model In The disclosure | √ | √ | √ | 59.3 |

It may be seen from above that, the model performance indicator of the Faster R-CNN may reach 52.67%, and the model performance indicator may be improved to 58.4% through the independent PDA network, the model performance indicator may be improved to 55.3% through the independent FDA network, and through end-to-end training, the model performance indicator of 59.3% may be obtained. Thus, accuracy of the model may be improved by using the PDA network and the FDA network.

Figure 17:
FIG. 17 is a schematic diagram of an effect of conversion from a Cityscapes dataset to a Foggy-Cityscapes dataset in an experimental result according to the disclosure.

FIG. 17 is a schematic diagram of an effect of conversion from a Cityscapes dataset to a Foggy-Cityscapes dataset in an experimental result according to the disclosure. As shown in the figure, an image (a) and an image (c) in FIG. 17 come from the Cityscapes dataset, and an image (b) and an image (d) in FIG. 17 come from the Foggy-Cityscapes dataset Table 3 shows an evaluation detection result obtained by using the Cityscapes dataset as a source dataset on the Foggy-Cityscapes dataset.

TABLE 3

| | PDA Network | FDA Network | PDA + FDA Network | Model Performance Indicator (%) |
|---|---|---|---|---|
| Faster R-CNN | — | — | — | 18.8 |
| State Of The Art | — | — | — | 27.6 |
| Model In The disclosure | √ | — | — | 27.1 |
| Model In The disclosure | — | √ | — | 23.6 |
| Model In The disclosure | √ | √ | √ | 28.9 |
| Oracle Teacher Network | — | — | — | 35.0 |

It may be seen from above that, use of the model provided in the disclosure may make a performance improvement by more than 10.1% over the result of the faster R-CNN, and make an improvement by more than 1.3% over the state of the art (SOTA), that is, the PDA network and the FDA network may both improve detection performance to a great extent. Based on wide experiments performed on several different datasets, the result proves that the model provided in the disclosure has relatively good robustness and superiority.

Figure 18:
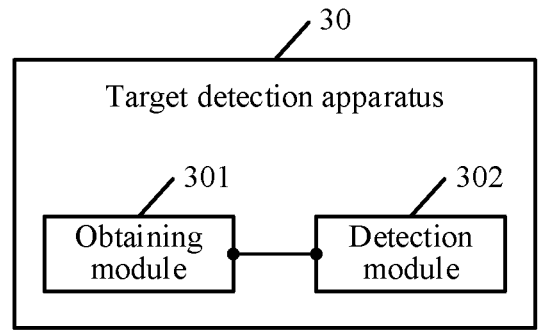
FIG. 18 is a schematic diagram of an embodiment of a target detection apparatus according to an embodiment of the disclosure.

A target detection apparatus in the disclosure is described below in detail. FIG. 18 is a schematic diagram of an embodiment of a target detection apparatus according to an embodiment of the disclosure. The target detection apparatus 30 includes:

an obtaining module 301, configured to obtain a first image, the first image belonging to a first domain;

the obtaining module 301 being further configured to obtain a second image corresponding to the first image, the second image belonging to a second domain, and the first domain and the second domain being different domains; and a detection module 302, configured to obtain, through a cross-domain image detection model, a detection result corresponding to the second image obtained by the obtaining module 301, the detection result including target localization information and target class information of a target object, the target object being a detected object in the first image, the cross-domain image detection model including a first network model and a second network model, the first network model being used for converting (or configured to convert) an image from the first domain into an image in the second domain, and the second network model being used for performing (or configured to perform) region localization on the image in the second domain.

In this embodiment, the obtaining module 301 obtains the first image, the first image belonging to the first domain, and the obtaining module 301 obtains the second image corresponding to the first image, the second image belonging to the second domain, and the first domain and the second domain being the different domains. The detection module 302 obtains, through the cross-domain image detection model, the detection result corresponding to the second image obtained by the obtaining module 301, the detection result including the target localization information and the target class information of the target object, the target object being the detected object in the first image, the cross-domain image detection model including the first network model and the second network model, the first network model being used for converting the image from the first domain into the image in the second domain, and the second network model being used for performing region localization on the image in the second domain.

In this embodiment of the disclosure, the image-based target detection apparatus is provided. The apparatus first obtains the first image, the first image belonging to the first domain; then obtains the second image corresponding to the first image through the cross-domain image detection model, the second image belonging to the second domain; and finally obtains the detection result corresponding to the second image through the cross-domain image detection model, the detection result including the target localization information and the target class information of the target object, and the target object belonging to the first image. Through the foregoing manner, target localization is performed without purposely using an image in a style the same as that of a test set image, but the style of the image is converted into the style of the test set image by using the cross-domain image detection model, and then target localization is performed on an image obtained after conversion, thereby improving accuracy of image localization and enhancing a model prediction effect.

Figure 19:
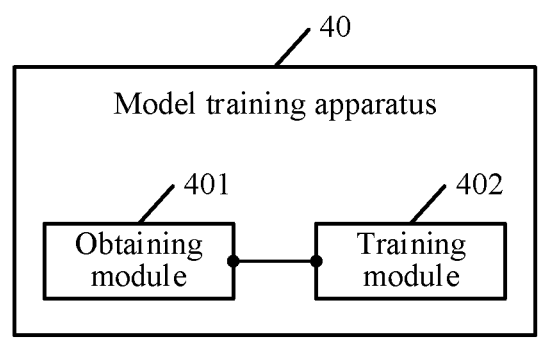
FIG. 19 is a schematic diagram of an embodiment of a model training apparatus according to an embodiment of the disclosure.

A model training apparatus in the disclosure is described below in detail. FIG. 19 is a schematic diagram of an embodiment of a model training apparatus according to an embodiment of the disclosure. The model training apparatus 40 includes:

an obtaining module 401, configured to obtain a training image and a test image, the training image belonging to a first domain, the test image belonging to a second domain, and the first domain and the second domain being different domains;

the obtaining module 401 being further configured to obtain a test style image corresponding to the training image through a first network model, and obtain a training style image corresponding to the test image through the first network model, the test style image belonging to the second domain, and the training style image belonging to the first domain;

the obtaining module 401 being further configured to obtain a predicted probability value corresponding to a candidate region through a second network model, the candidate region being a candidate bounding box extracted from the test image or the test style image;

the obtaining module being further configured to obtain a first prediction class probability value, a first prediction localization value, a second prediction class probability value, and a second prediction localization value that correspond to the test style image through the second network model; and a training module 402, configured to train the first network model and the second network model by using a target loss function and according to the predicted probability value, the test style image, the training style image, the first prediction class probability value, the first prediction localization value, the second prediction class probability value, and the second prediction localization value that are obtained by the obtaining module 401, to obtain a cross-domain image detection model.

In this embodiment, the obtaining module 401 obtains the training image and the test image, the training image belonging to the first domain, the test image belonging to the second domain, and the first domain and the second domain being the different domains. The obtaining module 401 obtains the test style image corresponding to the training image through the first network model, and obtains the training style image corresponding to the test image through the first network model, the test style image belonging to the second domain, and the training style image belonging to the first domain. The obtaining module 401 obtains the predicted probability value corresponding to the candidate region through the second network model, the candidate region being the candidate bounding box extracted from the test image or the test style image. The obtaining module obtains the first prediction class probability value, the first prediction localization value, the second prediction class probability value, and the second prediction localization value that correspond to the test style image through the second network model. The training module 402 trains the first network model and the second network model by using the target loss function and according to the predicted probability value, the test style image, the training style image, the first prediction class probability value, the first prediction localization value, the second prediction class probability value, and the second prediction localization value that are obtained by the obtaining module 401, to obtain the cross-domain image detection model.

In this embodiment of the disclosure, the model training apparatus is provided. The model training apparatus first obtains the training image and the test image; then obtains the test style image corresponding to the training image through the first network model, obtains the training style image corresponding to the test image through the first network model, obtains the predicted probability value corresponding to the candidate region through the second network model, and obtains the first prediction class probability value, the first prediction localization value, the second prediction class probability value, and the second prediction localization value corresponding to the test style image through the second network model; and finally trains the first network model and the second network model by using the target loss function, to obtain the cross-domain image detection model. Through the foregoing manner, the cross-domain image detection model obtained through training may implement cross-domain image conversion, the style of the training set image may be converted into the style of the test set image by using the cross-domain image detection model, and then target localization is performed on an image obtained after conversion, thereby improving accuracy of image localization and enhancing a model prediction effect.

In an embodiment, based on the embodiment corresponding to FIG. 19, in another embodiment of the model training apparatus 40 according to the embodiments of the disclosure, the training module 402 is specifically configured to
  determine a first loss function according to the test style image and the training style image;
  determine a second loss function according to the predicted probability value;

determine a third loss function according to the first prediction class probability value, the first prediction localization value, the second prediction class probability value, and the second prediction localization value;

generate the target loss function according to the first loss function, the second loss function, and the third loss function; and train the first network model and the second network model by using the target loss function.

Secondly, in this embodiment of the disclosure, a process of obtaining the target loss function is provided, that is, determining the first loss function according to the test style image and the training style image; then determining the second loss function according to the predicted probability value; then determining the third loss function according to the first prediction class probability value, the first prediction localization value, the second prediction class probability value, and the second prediction localization value; and finally generating the target loss function, and training the first network model and the second network model by using the target loss function. Through the foregoing manner, a model training process is divided into three parts which are correspondingly trained by using three loss functions respectively, thereby improving flexibility and operability of training.

In an embodiment, based on the embodiment corresponding to FIG. 19, in another embodiment of the model training apparatus 40 according to the embodiments of the disclosure, the training module 402 is specifically configured to determine the first loss function in the following manner:

$$L_{cyc}(G_{t-s}, G_{s-t}) = E_{t \sim X(t)}[\|G_{s-t}(G_{t-s}(x_t)) - x_t\|] + E_{s \sim X(s)}[\|G_{t-s}(G_{s-t}(x_s)) - x_s\|],$$

where $L_{cyc}(G_{t-s}, G_{s-t})$ represents the first loss function, $x_t$ represents the test image, $x_s$ represents the training image, $G_{s-t}$ represents a generator for converting the training image into the test style image, $G_{t-s}$ represents a generator for converting the test image into the training style image, $G_{t-s}(x_t)$ represents the training style image, $G_{s-t}(x_s)$ represents the test style image, $E_{s \sim X(s)}$ represents calculating an expected value of each training image in a training image set, and $E_{t \sim X(t)}$ represents calculating an expected value of each test image in a test image set.

Next, in this embodiment of the disclosure, an illustrative manner of determining a first loss function according to the test style image and the training style image is provided. Through the foregoing manner, the image content may be migrated from the source domain to the target domain without paired training data, and when the first network model is trained, it is only required that the image in the source domain and the image in the target domain are used as input, and it is not required that image content in the source domain matches that in the target domain, thereby having flexibility. Moreover, use of the first loss function may ensure that the training set image after two times of conversion is the same as or similar to the initial training set image as much as possible, and the test set image after two times of conversion is also the same as or similar to the initial test set image as much as possible.

Figure 20:
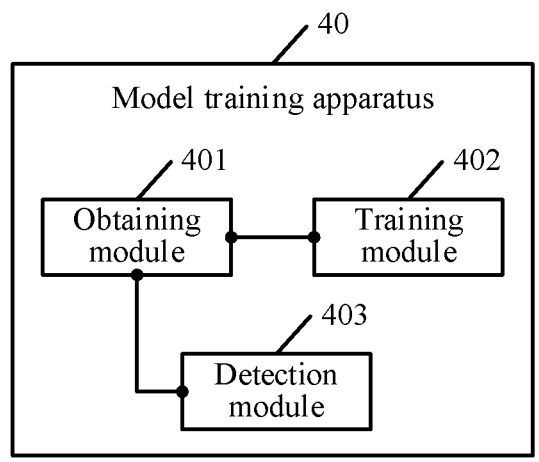
FIG. 20 is a schematic diagram of another embodiment of a model training apparatus according to an embodiment of the disclosure.

In an embodiment, based on the embodiment corresponding to FIG. 19, referring to FIG. 20, in another embodiment of the model training apparatus 40 provided in the embodiments of the disclosure, the model training apparatus 40 further includes a detection module 403.

The detection module 403 is configured to perform, after the obtaining module 401 obtains the test style image corresponding to the training image through the first network model and obtains the training style image corresponding to the test image through the first network model, reality detection on the test style image through a first discriminator, where the first discriminator is obtained after performing training by using a first adversarial loss function; and the detection module 403 is further configured to perform, after the obtaining module 401 obtains the test style image corresponding to the training image through the first network model and obtains the training style image corresponding to the test image through the first network model, reality detection on the training style image through a second discriminator, where the second discriminator is obtained after performing training by using a second adversarial loss function.

Further, in this embodiment of the disclosure, after the obtaining a test style image corresponding to the training image through a first network model, and obtaining a training style image corresponding to the test image through the first network model, the following may be further provided: Reality detection is performed on the test style image through a first discriminator, and reality detection is performed on the training style image through a second discriminator. Through the foregoing manner, reality recognition may be performed, by using discriminators, on images generated by generators, thereby facilitating an improvement in a model training effect.

In an embodiment, based on the embodiment corresponding to FIG. 20, in another embodiment of the model training apparatus 40 according to the embodiments of the disclosure, the obtaining module 401 is further configured to obtain, before the detection module 403 performs reality detection on the test style image through the first discriminator, the first adversarial loss function in the following manner:

$$L_{GAN}(D_t, G_{s-t}) = E_{t \sim X(t)}[\log D_t(x)] + E_{s \sim X(s)}[\log(1 - D_t(G_{s-t}(s)))],$$

where $L_{GAN}(D_t, G_{s-t})$ represents the first adversarial loss function, $E_{s \sim X(s)}$ represents calculating an expected value of each training image in a training image set, $E_{t \sim X(t)}$ represents calculating an expected value of each test image in a test image set, $D_t(\ )$ represents the first discriminator, s represents an image in the first domain, $G_{s-t}(\ )$ represents a network for converting the image in the first domain into an image in the second domain, and x represents an inputted image.

Still further, in this embodiment of the disclosure, before the performing reality detection on the test style image through a first discriminator, the following may be further provided: The first adversarial loss function is obtained, and a model effect is determined through the first adversarial loss function. Through the foregoing manner, an image transformed from the first domain to the second domain may be made closer to an image in the second domain, thereby improving feasibility of the solution.

In an embodiment, based on the embodiment corresponding to FIG. 20, in another embodiment of the model training apparatus 40 according to the embodiments of the disclosure, the obtaining module 401 is further configured to obtain, before the detection module 403 performs reality detection on the test style image through the first discriminator, the second adversarial loss function in the following manner:

$$L_{GAN}(D_s, G_{t\text{-}s}) = E_{s\sim X(t)}[\log D_s(x)] + E_{t\sim X(s)}[\log(1-D_s(G_{t\text{-}s}(t)))],$$

where $L_{GAN}(D_s, G_{t\text{-}s})$ represents the second adversarial loss function, $E_{s\sim X(t)}$ represents calculating an expected value of each training image in a training image set, $E_{t\sim X(t)}$ represents calculating an expected value of each test image in a test image set, $D_s(\,)$ represents the second discriminator, t represents an image in the second domain, $G_{t\text{-}s}(\,)$ represents a network for converting the image in the second domain into an image in the first domain, and x represents an inputted image.

Still further, in this embodiment of the disclosure, before the performing reality detection on the training style image through a second discriminator, the following may be further provided: The second adversarial loss function is obtained, and a model effect is determined through the second adversarial loss function. Through the foregoing manner, an image transformed from the second domain to the first domain may be made closer to an image in the first domain, thereby improving feasibility of the solution.

In an embodiment, based on the embodiment corresponding to FIG. 19 or FIG. 20, in another embodiment of the model training apparatus 40 according to the embodiments of the disclosure, the training module 402 is specifically configured to determine the second loss function in the following manner:

$$L_{domain} = -\Sigma_{i,j}[d \log p_{i,j} + (1-d)\log(1-p_{i,j})],$$

where $L_{domain}$ represents the second loss function, $p_{i,j}$ represents a predicted probability value of an $i^{th}$ candidate region on a $j^{th}$ class, and d represents an image source value.

Further, in this embodiment, an illustrative manner of determining the second loss function according to the predicted probability value is provided. Through the foregoing manner, whether a feature of an image comes from the real test set image, or the test style image into which the training set image is converted may be determined, thereby making the image outputted by the model closer to the actual image.

In an embodiment, based on the embodiment corresponding to FIG. 19 or FIG. 20, in another embodiment of the model training apparatus 40 according to the embodiments of the disclosure, the training module 402 is specifically configured to determine the third loss function in the following manner:

$$L_{det}(p,u,t^m,v) = L_{rpn\text{-}cls}(p_{rpn}, u_{rpn}) + L_{rpn\text{-}loc}(t_{rpn}^m, v_{rpn}) + L_{obj\text{-}cls}(p_{obj}, u_{obj}) + L_{obj\text{-}loc}(t_{obj}^m, v_{obj}),$$

where $L(p, u, t^m, v)_{det}$ represents the third loss function, $L_{rpn\text{-}cls}$ represents a classification loss function of a region proposal network (RPN) in the second network model, $p_{rpn}$ represents the first prediction class probability value of the RPN, $u_{rpn}$ represents a first real class probability value of the RPN, $L_{rpn\text{-}loc}$ represents a localization loss function of the RPN in the second network model, $t_{rpn}^m$ represents the first prediction localization value of the RPN, $v_{rpn}$ represents a first real localization value of the RPN, $L_{obj\text{-}cls}$ represents a classification loss function of a target detection network in the second network model, $p_{obj}$ represents the second prediction class probability value of the target detection network, $u_{obj}$ represents a second real class probability value of the target detection network, $L_{obj\text{-}loc}$ represents a localization loss function of the target detection network in the second network model, $t_{obj}^m$ represents the second prediction localization value of the target detection network, and Vow represents a second real localization value of the target detection network.

Further, in this embodiment of the disclosure, a method for determining a third loss function according to the first prediction class probability value, the first prediction localization value, the second prediction class probability value, and the second prediction localization value is provided. Through the foregoing manner, a specific implementation may be provided for model training, thereby improving feasibility and operability of the solution.

In an embodiment, based on the embodiment corresponding to FIG. 19 or FIG. 20, in another embodiment of the model training apparatus 40 according to the embodiments of the disclosure, the training module 402 is specifically configured to determine the target loss function in the following manner:

$$L = L_{cyc}(G_{t\text{-}s}, G_{s\text{-}t}) + L_{domain} + L_{det},$$

where L represents the target loss function, $L_{cyc}(G_{t\text{-}s}, G_{s\text{-}t})$ represents the first loss function, $L_{domain}$ represents the second loss function, and $L_{det}$ represents the third loss function.

Further, in this embodiment of the disclosure, an illustrative manner of determining the target loss function is provided. Through the foregoing manner, the target loss function generated with reference to three loss functions may better control training of the cross-domain image detection model, thereby improving reliability and operability of training.

Figure 21:
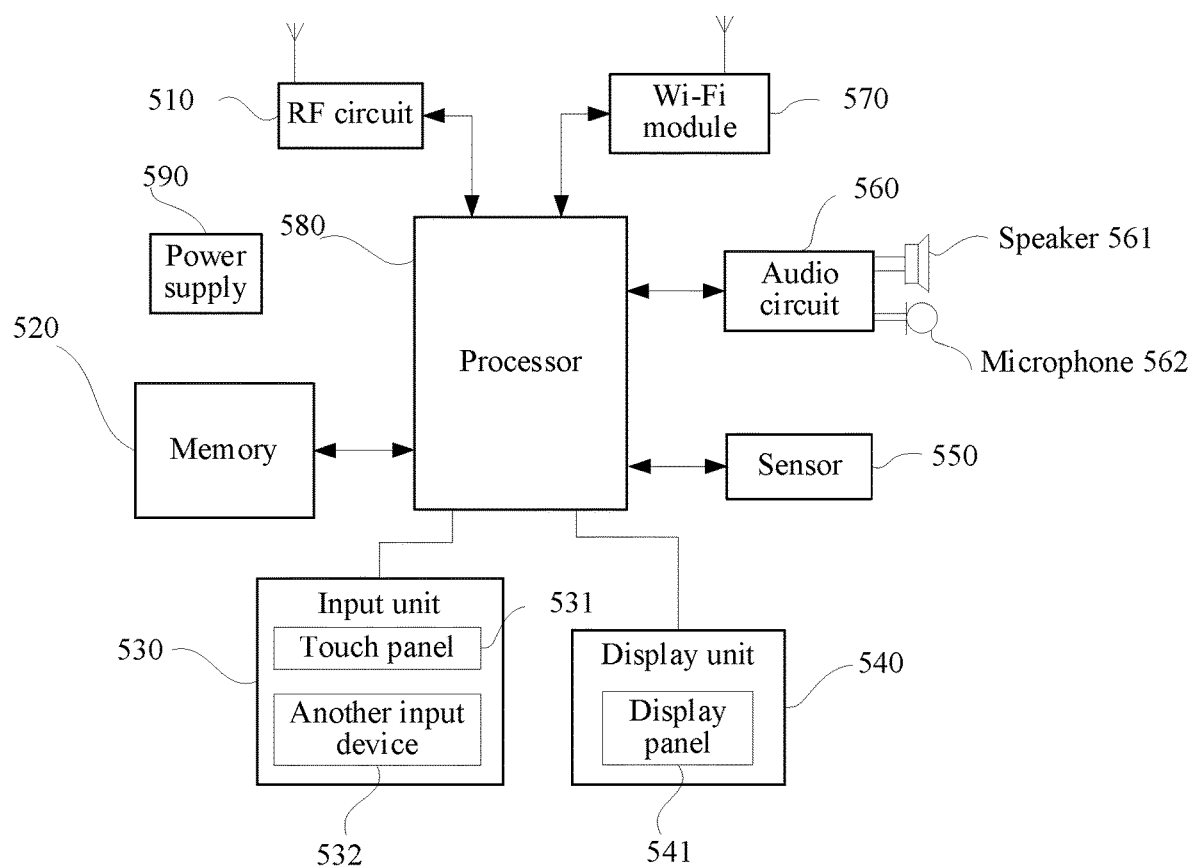
FIG. 21 is a schematic structural diagram of a terminal device according to an embodiment of the disclosure.

An embodiment of the disclosure further provides another target detection apparatus. As shown in FIG. 21, for ease of description, only parts related to the embodiments of the disclosure are shown. For specific technical details that are not disclosed, refer to the method part in the embodiments of the disclosure. The terminal device may be any terminal device including a mobile phone, a tablet computer, a personal digital assistant (PDA), a point of sales (POS), and an on-board computer, and the terminal device being a mobile phone is used as an example.

FIG. 21 shows a block diagram of the structure of a part of a mobile phone related to a terminal device according to an embodiment of the disclosure. Referring to FIG. 21, the mobile phone includes components such as a radio frequency (RF) circuit 510, a memory 520, an input unit 530, a display unit 540, a sensor 550, an audio circuit 560, a wireless fidelity (Wi-Fi) module 570, a processor 580, and a power supply 590. Persons skilled in the art would understand that the structure of the mobile phone shown in FIG. 21 does not constitute a limitation on the mobile phone, and the mobile phone may include more or fewer components than those shown in the figure, or some components may be combined, or a different component deployment may be used.

The following makes a specific description of the components of the mobile phone with reference to FIG. 21.

The RF circuit 510 may be configured to receive and send signals during an information receiving and sending process or a call process. Specifically, the RF circuit receives downlink information from a base station, then delivers the downlink information to the processor 580 for processing, and sends designed uplink data to the base station. Generally, the RF circuit 510 includes, but is not limited to, an antenna, at least one amplifier, a transceiver, a coupler, a low noise amplifier (LNA), and a duplexer. In addition, the RF circuit 510 may alternatively communicate with a network and another device through wireless communication. The wireless communication may use any communication standard or protocol, including but not limited to Global System for Mobile Communications (GSM), general packet radio service (GPRS), Code Division Multiple Access (CDMA), Wideband Code Division Multiple Access (WCDMA), Long Term Evolution (LTE), email, Short Messaging Service (SMS), and the like.

The memory 520 may be configured to store a software program and module. The processor 580 runs the software program and module stored in the memory 520, to implement various functional applications and data processing of the mobile phone. The memory 520 may include a program storage area and a data storage area. The program storage area may store an operating system, an application program required by at least one function (for example, a sound playback function and an image display function), and the like. The data storage area may store data (for example, audio data and an address book) created according to the use of the mobile phone, and the like. In addition, the memory 520 may include a high speed random-access memory, and may alternatively include a non-volatile memory, for example, at least one magnetic disk storage device, a flash memory, or another volatile solid-state storage device.

The input unit 530 may be configured to receive input digit or character information, and generate a key signal input related to the user setting and function control of the mobile phone. Specifically, the input unit 530 may include a touch panel 531 and another input device 532. The touch panel 531, which may alternatively be referred to as a touch screen, may collect a touch operation of a user on or near the touch panel (such as an operation of a user on the touch panel 531 or near the touch panel 531 by using any suitable object or accessory such as a finger or a stylus), and drive a corresponding connection apparatus according to a preset program. In an embodiment, the touch panel 531 may include two parts: a touch detection apparatus and a touch controller. The touch detection apparatus detects a touch position of the user, detects a signal generated by the touch operation, and transfers the signal to the touch controller. The touch controller receives the touch information from the touch detection apparatus, converts the touch information into touch point coordinates, and transmits the touch point coordinates to the processor 580. Moreover, the touch controller may receive and execute a command transmitted from the processor 580. In addition, the touch panel 531 may be implemented by using various types, such as a resistive type, a capacitive type, an infrared type, and a surface acoustic wave type. In addition to the touch panel 531, the input unit 530 may further include the another input device 532. Specifically, the another input device 532 may include, but is not limited to, one or more of a physical keyboard, a functional key (such as a volume control key or a switch key), a track ball, a mouse, and a joystick.

The display unit 540 may be configured to display information inputted by the user or information provided for the user, and various menus of the mobile phone. The display unit 540 may include a display panel 541. In an embodiment, the display panel 541 may be configured in the form of a liquid crystal display (LCD), an organic light-emitting diode (OLED), or the like. Further, the touch panel 531 may cover the display panel 541. After detecting a touch operation on or near the touch panel 531, the touch panel 531 transfers the operation to the processor 580 to determine a touch event type. Then the processor 580 provides corresponding visual output on the display panel 541 according to the touch event type. Although in FIG. 21, the touch panel 531 and the display panel 541 are used as two separate parts to implement input and output functions of the mobile phone, in some embodiments, the touch panel 531 and the display panel 541 may be integrated to implement the input and output functions of the mobile phone.

The mobile phone may further include at least one sensor 550 such as an optical sensor, a motion sensor, and other sensors. Specifically, the optical sensor may include an ambient light sensor and a proximity sensor. The ambient light sensor may adjust luminance of the display panel 541 according to brightness of the ambient light. The proximity sensor may switch off the display panel 541 and/or backlight when the mobile phone is moved to the ear. As one type of motion sensor, an acceleration sensor may detect magnitude of accelerations in various directions (generally on three axes), may detect magnitude and a direction of the gravity when static, and may be applied to an application that recognizes the attitude of the mobile phone (for example, switching between landscape orientation and portrait orientation, a related game, and magnetometer attitude calibration), a function related to vibration recognition (such as a pedometer and a knock), and the like. Other sensors, such as a gyroscope, a barometer, a hygrometer, a thermometer, and an infrared sensor, which may be configured in the mobile phone, are not further described herein.

The audio circuit 560, a speaker 561, and a microphone 562 may provide audio interfaces between a user and the mobile phone. The audio circuit 560 may convert received audio data into an electrical signal and transmit the electrical signal to the speaker 561. The speaker 561 converts the electrical signal into a sound signal for output. On the other hand, the microphone 562 converts a collected sound signal into an electrical signal. The audio circuit 560 receives the electrical signal, converts the electrical signal into audio data, and outputs the audio data to the processor 580 for processing. Then, the processor sends the audio data to, for example, another mobile phone by using the RF circuit 510, or outputs the audio data to the memory 520 for further processing.

Wi-Fi is a short distance wireless transmission technology. The mobile phone may help, by using the Wi-Fi module 570, a user to receive and send an email, browse a web page, access streaming media, and the like, which provides wireless broadband Internet access for the user. Although FIG. 21 shows the Wi-Fi module 570, it would be understood that the Wi-Fi module is not a necessary component of the mobile phone, and the Wi-Fi module 1070 may be omitted as required provided that the scope of the essence of the disclosure is not changed.

The processor 580 is a control center of the mobile phone, and is connected to various parts of the entire mobile phone by using various interfaces and lines. By running or executing a software program and/or module stored in the memory 520, and invoking data stored in the memory 520, the processor executes various functions of the mobile phone and performs data processing, thereby monitoring the entire mobile phone. In an embodiment, the processor 580 may include one or more processing units. In an embodiment, the processor 580 may integrate an application processor and a modem processor. The application processor may process an operating system, a user interface, an application program, and the like. The modem processor may process wireless communication. It would be understood that the foregoing modem may alternatively not be integrated into the processor 580.

The mobile phone further includes the power supply 590 (such as a battery) for supplying power to the components. In an embodiment, the power supply may be logically connected to the processor 580 by using a power management system, thereby implementing functions such as charging, discharging, and power consumption management by using the power management system.

Although not shown in the figure, the mobile phone may further include a camera, a Bluetooth module, and the like. Details are not described herein again.

In this embodiment of the disclosure, the processor 580 included in the terminal device further has the following functions:

obtaining a first image, the first image belonging to a first domain;

obtaining a second image corresponding to the first image, the second image belonging to a second domain, and the first domain and the second domain being different domains; and obtaining a detection result corresponding to the second image through a cross-domain image detection model, the detection result including target localization information and target class information of a target object, the target object being a detected object in the first image, the cross-domain image detection model including a first network model and a second network model, the first network model being used for converting an image from the first domain into an image in the second domain, and the second network model being used for performing region localization on the image in the second domain.

In this embodiment of the disclosure, the processor 580 included in the terminal device further has the following functions:

obtaining a training image and a test image, the training image belonging to a first domain, the test image belonging to a second domain, and the first domain and the second domain being different domains;

obtaining a test style image corresponding to the training image through a first network model, and obtaining a training style image corresponding to the test image through the first network model, the test style image belonging to the second domain, and the training style image belonging to the first domain;

obtaining a predicted probability value corresponding to a candidate region through a second network model, the candidate region being a candidate bounding box extracted from the test image or the test style image;

obtaining a first prediction class probability value, a first prediction localization value, a second prediction class probability value, and a second prediction localization value that correspond to the test style image through the second network model; and training the first network model and the second network model by using a target loss function and according to the predicted probability value, the test style image, the training style image, the first prediction class probability value, the first prediction localization value, the second prediction class probability value, and the second prediction localization value, to obtain a cross-domain image detection model.

Figure 22:
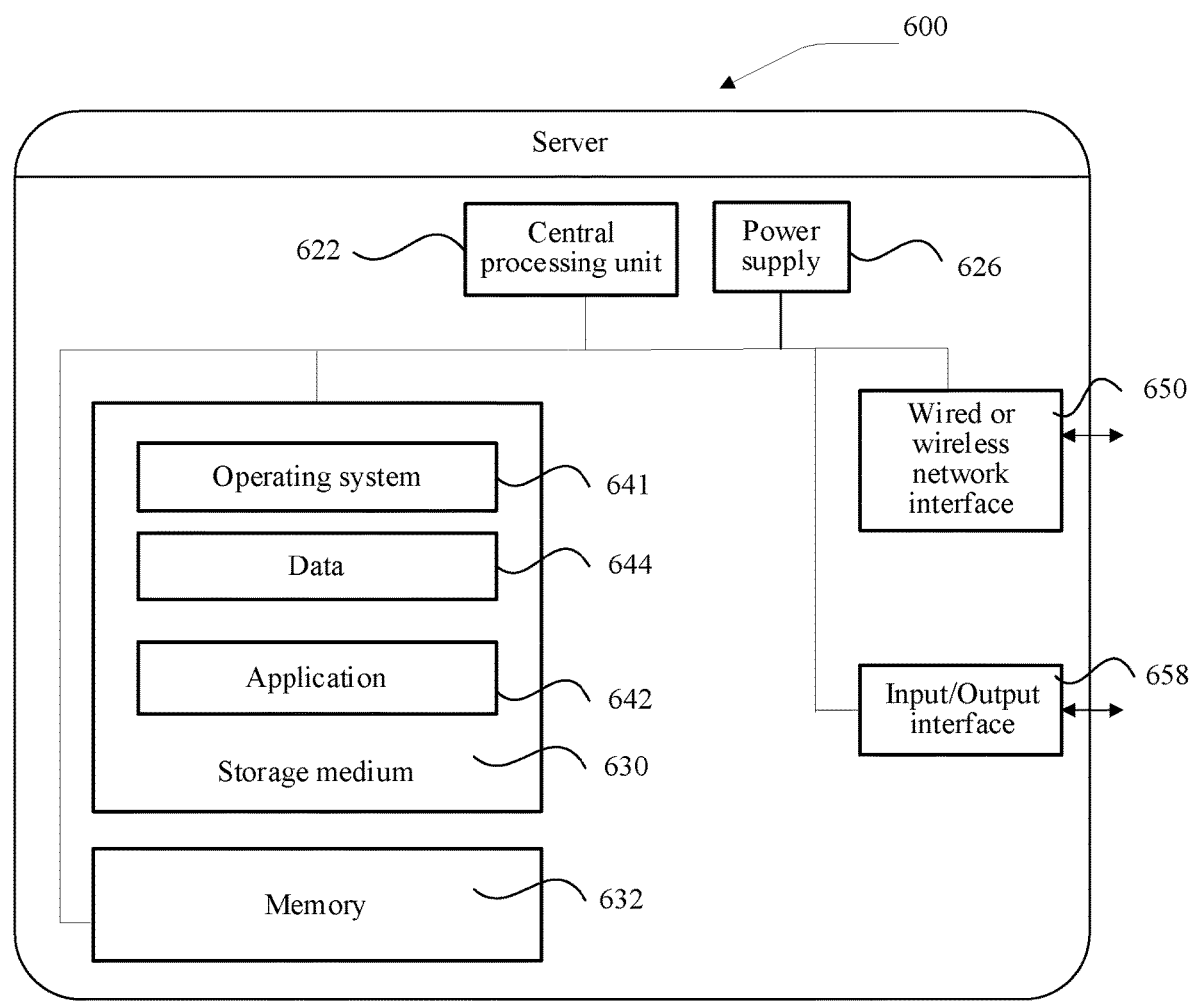
FIG. 22 is a schematic structural diagram of a server according to an embodiment of the disclosure.

FIG. 22 is a schematic structural diagram of a server according to an embodiment of the disclosure. The server 600 may vary greatly due to different configurations or performance, and may include one or more central processing units (CPUs) 622 (for example, one or more processors) and a memory 632, and one or more storage media 630 (for example, one or more mass storage devices) that store an application program 642 or data 644. The memory 632 and the storage medium 630 may implement transient storage or permanent storage. The program stored in the storage medium 630 may include one or more modules (not shown in the figure), and each module may include a series of instruction operations on the server. Still further, the CPU 622 may be configured to communicate with the storage medium 630 to perform the series of instruction operations in the storage medium 630 on the server 600.

The server 600 may further include one or more power supplies 626, one or more wired or wireless network interfaces 650, one or more input/output interfaces 658, and/or one or more operating systems 641 such as Windows Server™, Mac OS X™, Unix™, Linux™ or FreeBSD™.

The operations performed by the server in the foregoing embodiments may be based on the server structure shown in FIG. 22.

In this embodiment of the disclosure, the CPU 622 included in the server further has the following functions:

obtaining a training image and a test image, the training image belonging to a first domain, the test image belonging to a second domain, and the first domain and the second domain being different domains;

obtaining a test style image corresponding to the training image through a first network model, and obtaining a training style image corresponding to the test image through the first network model, the test style image belonging to the second domain, and the training style image belonging to the first domain;

obtaining a predicted probability value corresponding to a candidate region through a second network model, the candidate region being a candidate bounding box extracted from the test image or the test style image;

obtaining a first prediction class probability value, a first prediction localization value, a second prediction class probability value, and a second prediction localization value that correspond to the test style image through the second network model; and training the first network model and the second network model by using a target loss function and according to the predicted probability value, the test style image, the training style image, the first prediction class probability value, the first prediction localization value, the second prediction class probability value, and the second prediction localization value, to obtain a cross-domain image detection model.

In an embodiment, the CPU 622 included in the server is specifically configured to perform the following operations:

determining a first loss function according to the test style image and the training style image;

determining a second loss function according to the predicted probability value;

determining a third loss function according to the first prediction class probability value, the first prediction localization value, the second prediction class probability value, and the second prediction localization value;

generating the target loss function according to the first loss function, the second loss function, and the third loss function; and training the first network model and the second network model by using the target loss function.

In this embodiment of the disclosure, the CPU 622 included in the server further has the following functions:

obtaining a first image, the first image belonging to a first domain;

obtaining a second image corresponding to the first image, the second image belonging to a second domain, and the first domain and the second domain being different domains; and obtaining a detection result corresponding to the second image through a cross-domain image detection model, the detection result including target localization information and target class information of a target object, the target object being a detected object in the first image, the cross-domain image detection model including a first network model and a second network model, the first network model being used for converting an image from the first domain into an image in the second domain, and the second network model being used for performing region localization on the image in the second domain.

The embodiments of the disclosure further provide a computer-readable storage medium, configured to store program code, the program code being used for performing the following model training operations:

obtaining a training image and a test image, the training image belonging to a first domain, the test image belonging to a second domain, and the first domain and the second domain being different domains;

obtaining a test style image corresponding to the training image through a first network model, and obtaining a training style image corresponding to the test image through the first network model, the test style image belonging to the second domain, and the training style image belonging to the first domain;

obtaining a predicted probability value corresponding to a candidate region through a second network model, the candidate region being a candidate bounding box extracted from the test image or the test style image;

obtaining a first prediction class probability value, a first prediction localization value, a second prediction class probability value, and a second prediction localization value that correspond to the test style image through the second network model; and training the first network model and the second network model by using a target loss function and according to the predicted probability value, the test style image, the training style image, the first prediction class probability value, the first prediction localization value, the second prediction class probability value, and the second prediction localization value, to obtain a cross-domain image detection model.

In a possible implementation, the program code may be used for performing the following operations:

determining a first loss function according to the test style image and the training style image;

determining a second loss function according to the predicted probability value;

determining a third loss function according to the first prediction class probability value, the first prediction localization value, the second prediction class probability value, and the second prediction localization value;

generating the target loss function according to the first loss function, the second loss function, and the third loss function; and training the first network model and the second network model by using the target loss function.

In a possible implementation, the program code may be used for performing the following operations:

determining the first loss function in the following manner:

$$L_{cyc}(G_{t\text{-}s}, G_{s\text{-}t}) = E_{t \sim X(t)}[\|G_{s\text{-}t}(G_{t\text{-}s}(x_t)) - x_t\|] + E_{s \sim X(s)}[\|G_{t\text{-}s}(G_{s\text{-}t}(x_s)) - x_s\|],$$

where $L_{cyc}(G_{t\text{-}s}, G_{s\text{-}t})$ represents the first loss function, $x_t$ represents the test image, $x_s$ represents the training image, $G_{s\text{-}t}$ represents a generator for converting the training image into the test style image, $G_{t\text{-}s}$ represents a generator for converting the test image into the training style image, $G_{t\text{-}s}(x_t)$ represents the training style image, $G_{s\text{-}t}(x_s)$ represents the test style image, $E_{s \sim X(s)}$ represents calculating an expected value of each training image in a training image set, and $E_{t \sim X(t)}$ represents calculating an expected value of each test image in a test image set.

In a possible implementation, the program code may be used for performing the following operations:

performing reality detection on the test style image through a first discriminator, where the first discriminator is obtained after performing training by using a first adversarial loss function; and performing reality detection on the training style image through a second discriminator, where the second discriminator is obtained after performing training by using a second adversarial loss function.

In a possible implementation, before the performing reality detection on the test style image through a first discriminator, the method further includes:

obtaining the first adversarial loss function in the following manner:

$$L_{GAN}(D_t, G_{s\text{-}t}) = E_{t \sim X(t)}[\log D_t(x)] + E_{s \sim X(s)}[\log(1 - D_t(G_{s\text{-}t}(s)))],$$

where $L_{GAN}(D_t, G_{s\text{-}t})$ represents the first adversarial loss function, $E_{s \sim X(s)}$ represents calculating an expected value of each training image in a training image set, $E_{t \sim X(t)}$ represents calculating an expected value of each test image in a test image set, $D_t(\ )$ represents the first discriminator, s represents an image in the first domain, $G_{s\text{-}t}(\ )$ represents a network for converting the image in the first domain into an image in the second domain, and x represents an inputted image.

In a possible implementation, the program code may be used for performing the following operations:

obtaining the second adversarial loss function in the following manner:

$$L_{GAN}(D_s, G_{t\text{-}s}) = E_{s \sim X(s)}[\log D_s(x)] + E_{t \sim X(t)}[\log(1 - D_t(G_{t\text{-}s}(t)))],$$

where $L_{GAN}(D_s, G_{t\text{-}s})$ represents the second adversarial loss function, $E_{s \sim X(s)}$ represents calculating an expected value of each training image in a training image set, $E_{t \sim X(t)}$ represents calculating an expected value of each test image in a test image set, $D_s(\ )$ represents the second discriminator, t represents an image in the second domain, $G_{t\text{-}s}(\ )$ represents a network for converting the image in the second domain into an image in the first domain, and x represents an inputted image.

In a possible implementation, the program code may be used for performing the following operations:

determining the second loss function in the following manner:

$$L_{domain} = -\Sigma_{i,j}[d \log p_{i,j} + (1 - d)\log(1 - p_{i,j})],$$

where $L_{domain}$ represents the second loss function, $p_{i,j}$ represents a predicted probability value of an $i^{th}$ candidate region on a $j^{th}$ class, and d represents an image source value.

In a possible implementation, the program code may be used for performing the following operations:

determining the third loss function in the following manner:

$$L_{det}(p, u, t^m, v) = L_{rpn\text{-}cls}(p_{rpn}, u_{rpn}) + L_{rpn\text{-}loc}(t_{rpn}{}^m, v_{rpn}) + L_{obj\text{-}cls}(p_{obj}, u_{obj}) + L_{obj\text{-}loc}(t_{obj}{}^m, v_{obj}),$$

where L(p, u, $t^m$, v) det represents the third loss function, $L_{rpn\text{-}cls}$ represents a classification loss function of a region proposal network (RPN) in the second network model, $p_{rpn}$ represents the first prediction class probability value of the RPN, $u_{rpn}$ represents a first real class probability value of the RPN, $L_{rpn\text{-}loc}$ represents a localization loss function of the RPN in the second network model, $t_{rpn}^m$ represents the first prediction localization value of the RPN, $v_{rpn}$ represents a first real localization value of the RPN, $L_{obj\text{-}cls}$ represents a classification loss function of a target detection network in the second network model, $p_{obj}$ represents the second prediction class probability value of the target detection network, $u_{obj}$ represents a second real class probability value of the target detection network, $L_{obj\text{-}loc}$ represents a localization loss function of the target detection network in the second network model, $t_{obj}^m$ represents the second prediction localization value of the target detection network, and Vow represents a second real localization value of the target detection network.

In a possible implementation, the program code may be used for performing the following operations:

determining the target loss function in the following manner:

$$L = L_{cyc}(G_{t\text{-}s}, G_{s\text{-}t}) + L_{domain} + L_{det},$$

where L represents the target loss function, $L_{cyc}(G_{t\text{-}s}, G_{s\text{-}t})$ represents the first loss function, $L_{domain}$ represents the second loss function, and $L_{det}$ represents the third loss function.

A person skilled in the art may clearly understand that for convenience and conciseness of description, for specific working processes of the foregoing systems, devices and units, reference may be made to the corresponding processes in the foregoing method embodiments, and details are not described herein again.

In the several embodiments provided in the disclosure, it is to be understood that the disclosed system, apparatus, and method may be implemented in other manners. For example, the described apparatus embodiment is merely an example. For example, the unit division is merely a logical function division and may be other division during actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate components may or may not be physically separated, and the components displayed as units may or may not be physical units, and may be located in one place or may be distributed over a plurality of network units. Some or all of the units may be selected according to actual needs to achieve the objectives of the solutions of the embodiments.

In addition, functional units in the embodiments of the disclosure may be integrated into one processing unit, or each of the units may be physically separated, or two or more units may be integrated into one unit. The integrated unit may be implemented in the form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the disclosure essentially, or the part contributing to the related art, or all or some of the technical solutions may be implemented in the form of a software product. The computer software product is stored in a storage medium and includes several pieces of program code for instructing a computer device (which may be a personal computer, a server, a network device, or the like) to perform all or some of the operations of the methods described in the embodiments of the disclosure. The foregoing storage medium includes: any medium that may store program code, such as a USB flash drive, a removable hard disk, a read-only memory (read-only memory, ROM), a random access memory (random access memory, RAM), a magnetic disk or an optical disc.

It may be seen from the foregoing technical solutions that the embodiments of the disclosure have the following advantages.

In the embodiments of the disclosure, an image-based target detection method is provided. A first image is first obtained, the first image belonging to a first domain, a second image corresponding to the first image is then obtained through a cross-domain image detection model, the second image belonging to a second domain, and a detection result corresponding to the second image is finally obtained through the cross-domain image detection model, the detection result including target localization information and target class information of a target object, and the target object belonging to the first image. Through the foregoing manner, target localization is performed without purposely using an image in a style the same as that of a test set image, but the style of the image is converted into the style of the test set image by using the cross-domain image detection model, and then target localization is performed on an image obtained after conversion, thereby improving accuracy of image localization and enhancing a model prediction effect.

At least one of the components, elements, modules or units described herein may be embodied as various numbers of hardware, software and/or firmware structures that execute respective functions described above, according to an example embodiment. For example, at least one of these components, elements or units may use a direct circuit structure, such as a memory, a processor, a logic circuit, a look-up table, etc. that may execute the respective functions through controls of one or more microprocessors or other control apparatuses. Also, at least one of these components, elements or units may be specifically embodied by a module, a program, or a part of code, which contains one or more executable instructions for performing specified logic functions, and executed by one or more microprocessors or other control apparatuses. Also, at least one of these components, elements or units may further include or implemented by a processor such as a central processing unit (CPU) that performs the respective functions, a microprocessor, or the like. Two or more of these components, elements or units may be combined into one single component, element or unit which performs all operations or functions of the combined two or more components, elements of units. Also, at least part of functions of at least one of these components, elements or units may be performed by another of these components, element or units. Further, although a bus is not illustrated in the above block diagrams, communication between the components, elements or units may be performed through the bus. Functional aspects of the above example embodiments may be implemented in algorithms that execute on one or more processors. Furthermore, the components, elements or units represented by a block or processing operations may employ any number of related art techniques for electronics configuration, signal processing and/or control, data processing and the like.

The foregoing embodiments are merely intended for describing the technical solutions of the disclosure, but not for limiting the disclosure. Although the disclosure is described in detail with reference to the foregoing embodiments, a person of ordinary skill in the art is to understand that they may still make modifications to the technical solutions described in the foregoing embodiments or make equivalent replacements to some technical features thereof, without departing from the spirit and scope of the technical solutions of the embodiments of the disclosure.

What is claimed is:

1. A model training method, comprising:
   obtaining a test style image corresponding to a training image through a first network model, and obtaining a training style image corresponding to a test image through the first network model, the training image and the training style image belonging to a first domain, the test image and the test style image belonging to a second domain, and the first domain and the second domain being different domains;
   obtaining, through a second network model, a predicted probability value corresponding to a probability of a candidate region with respect to each class, the candidate region being a candidate bounding box extracted from the test image or the test style image; and
   training the first network model and the second network model by using a target loss function and based on the predicted probability value, the test style image, the training style image, to obtain a cross-domain image detection model.

2. The method according to claim 1, further comprising:
   obtaining a first prediction class probability value and a first prediction localization value, which are prediction values corresponding to the test style image and outputted by a region proposal network (RPN) of the second network model, and obtaining a second prediction class probability value and a second prediction localization value, which are prediction values corresponding to the test style image outputted by a target detection network of the second network model.

3. The method according to claim 2, wherein the training the first network model and the second network model comprises training the first network model and the second network model further by using the target loss function and based on the predicted probability value, the test style image, the training style image, the first prediction class probability value, the first prediction localization value, the second prediction class probability value, and the second prediction localization value.

4. The method according to claim 2, further comprising:
   determining a first loss function according to the test style image and the training style image;
   determining a second loss function according to the predicted probability value;
   determining a third loss function according to the first prediction class probability value, the first prediction localization value, the second prediction class probability value, and the second prediction localization value; and
   generating the target loss function according to the first loss function, the second loss function, and the third loss function.

5. The method according to claim 4, wherein the training the first network model and the second network model comprises training the first network model and the second network model by using the target loss function.

6. The method according to claim 1, further comprising, after the obtaining the test style image:
   performing reality detection on the test style image through a discriminator that is obtained based on training by using a first adversarial loss function.

7. The method according to claim 1, further comprising, after the obtaining the training style image:
   performing reality detection on the training style image through a discriminator that is obtained based on training by using a second adversarial loss function.

8. The method according to claim 1, further comprising:
   obtaining a first image belonging to the first domain;
   obtaining a second image corresponding to the first image, the second image belonging to the second domain; and
   obtaining a detection result corresponding to the second image through the cross-domain image detection model, the cross-domain image detection model comprising the first network model and the second network model.

9. The method according to claim 8, wherein the detection result comprises target localization information and target class information of a target object, the target object being a detected object in the first image.

10. A non-transitory computer-readable storage medium storing program code, the program code being executable by at least one processor to cause the at least one processor to perform operations of the method according to claim 8.

11. A non-transitory computer-readable storage medium storing program code, the program code being executable by at least one processor to cause the at least one processor to perform operations of the method according to claim 1.

12. A model training apparatus, comprising:
    at least one memory configured to store program code; and
    at least one processor configured to read the program code and operate as instructed by the program code, the program code comprising:
      first obtaining code configured to cause at least one of the at least one processor to obtain a test style image corresponding to a training image through a first network model, and obtain a training style image corresponding to a test image through the first network model, the training image and the training style image belonging to a first domain, the test image and the test style image belonging to a second domain, and the first domain and the second domain being different domains
      second obtaining code configured to cause at least one of the at least one processor to, through a second network model, obtain a predicted probability value corresponding to a probability of a candidate region with respect to each class, the candidate region being a candidate bounding box extracted from the test image or the test style image; and
      training code configured to cause at least one of the at least one processor to train the first network model and the second network model by using a target loss function and based on the predicted probability value, the test style image, the training style image, to obtain a cross-domain image detection model.

13. The apparatus according to claim 12, wherein the program code further comprises:
    third obtaining code configured to cause at least one of the at least one processor to obtain a first prediction class probability value and a first prediction localization value, which are prediction values corresponding to the test style image and outputted by a region proposal network (RPN) of the second network model, and obtain a second prediction class probability value and a second prediction localization value, which are prediction values corresponding to the test style image outputted by a target detection network of the second network model, and wherein the training code is configured to cause at least one of the at least one processor to train the first network model and the second network model by using the target loss function and based on the predicted probability value, the test style image, the training style image, the first prediction class probability value, the first prediction localization value, the second prediction class probability value, and the second prediction localization value, to obtain the cross-domain image detection model.

14. A terminal device comprising:
at least one memory configured to store program code; and
at least one processor configured to read the program code and operate as instructed by the program code, the program code comprising:
first obtaining code configured to cause at least one of the at least one processor to obtain a first image belonging to a first domain, a second image corresponding to the first image, the second image belonging to a second domain, and the first domain and the second domain being different domains;
second obtaining code configured to cause at least one of the at least one processor to obtain a detection result corresponding to the second image through a cross-domain image detection model, the detection result being with respect to a target object that is a detected object in the first image, the cross-domain image detection model comprising a first network model and a second network model, the first network model configured to convert an image from the first domain into an image in the second domain, and the second network model configured to perform object detection on the image in the second domain.

15. The terminal device according to claim 14, wherein the program code further comprises:
third obtaining code configured to cause at least one of the at least one processor to obtain a test style image corresponding to a training image through the first network model, and obtaining a training style image corresponding to a test image through the first network model, the training image and the training style image belonging to the first domain, the test image and the test style image belonging to the second domain;

first determining code configured to cause at least one of the at least one processor to determine a first loss function according to the test style image and the training style image; and
second determining code configured to cause at least one of the at least one processor to determine a second loss function according to a predicted probability value corresponding to a probability of a candidate region with respect to each class; the candidate region being a candidate bounding box extracted from the test image or the test style image.

16. The terminal device according to claim 15, wherein the program code further comprises:
generating code configured to cause at least one of the at least one processor to generate a target loss function according to the first loss function and the second loss function; and
training code configured to cause at least one of the at least one processor to train the first network model and the second network model by using the target loss function.

17. The terminal device according to claim 16, wherein the program code further comprises:
third determining code configured to cause at least one of the at least one processor to determine a third loss function according to a first prediction class probability value and a first prediction localization value, which are prediction values corresponding to the test style image and outputted by a region proposal network (RPN) of the second network model, and obtaining a second prediction class probability value and a second prediction localization value, which are prediction values corresponding to the test style image outputted by a target detection network of the second network model.

18. The terminal device according to claim 17, wherein the generating code is configured to cause at least one of the at least one processor to generate the target loss function based on the first loss function, the second loss function, and the third loss function.

19. The terminal device according to claim 15, wherein the program code further comprises:
first reality detection determining code configured to cause at least one of the at least one processor to perform reality detection on the test style image through a discriminator that is obtained based on training by using a first adversarial loss function.

20. The terminal device according to claim 15, wherein the program code further comprises:
second reality detection determining code configured to cause at least one of the at least one processor to perform reality detection on the training style image through a discriminator that is obtained based on training by using a second adversarial loss function.

* * * * *